US012587811B2

(12) United States Patent
Moon et al.

(10) Patent No.: US 12,587,811 B2
(45) Date of Patent: Mar. 24, 2026

(54) METHOD AND APPARATUS TO SUPPORT VIRTUAL NETWORK IN WIRELESS COMMUNICATION NETWORK

(71) Applicant: Samsung Electronics Co., Ltd., Suwon-si (KR)

(72) Inventors: Sangjun Moon, Suwon-si (KR); Youngkyo Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 600 days.

(21) Appl. No.: 17/735,385

(22) Filed: May 3, 2022

(65) Prior Publication Data

US 2022/0360948 A1 Nov. 10, 2022

(30) Foreign Application Priority Data

May 7, 2021 (KR) ........................ 10-2021-0059278

(51) Int. Cl.
*H04W 4/06* (2009.01)
*H04L 12/46* (2006.01)
(Continued)

(52) U.S. Cl.
CPC .............. *H04W 4/06* (2013.01); *H04L 41/40* (2022.05); *H04L 45/308* (2013.01); *H04L 45/76* (2022.05); *H04L 12/4675* (2013.01); *H04W 84/12* (2013.01)

(58) Field of Classification Search
CPC ............. H04L 12/4675; H04L 41/0893; H04L 41/0894; H04L 41/0895; H04L 41/40;
(Continued)

(56) References Cited

U.S. PATENT DOCUMENTS 10,868,760 B2 * 12/2020 Banerjee ............. H04L 61/2521
10,904,036 B2 * 1/2021 Du ....................... H04L 12/4641
(Continued)

FOREIGN PATENT DOCUMENTS

CN 111669754 A * 9/2020 ............ H04W 24/02
CN 114915649 A * 8/2022
(Continued)

OTHER PUBLICATIONS

Shi, "Data Forwarding Method, System and Non-volatile Storage Medium," English Machine Translation of Shi (CN 114915649 A), Clarivate Analytics, pp. 1-19 (Year: 2024).*
(Continued)

*Primary Examiner* — Marcus Smith
*Assistant Examiner* — Kai Chang
(74) *Attorney, Agent, or Firm* — Jefferson IP Law, LLP

(57) ABSTRACT

The disclosure relates to a $5^{th}$ generation (5G) or $6^{th}$ generation (6G) communication system for supporting a higher data transmission rate. A method performed by a first network entity in a wireless communication network is provided. The method includes transmitting, to a second network entity, a first message including data to be used in a plurality of networks included in a virtual network (VN) group, a VN identifier (ID), group data, and receiving, from the second network entity in response to the first message, a second message including the data to be used in the plurality of networks, the VN ID, the group data, information indicating a processing result related to the first message.

18 Claims, 11 Drawing Sheets

(51) Int. Cl.

| | |
|---|---|
| *H04L 41/40* | (2022.01) |
| *H04L 45/302* | (2022.01) |
| *H04L 45/76* | (2022.01) |
| *H04W 84/12* | (2009.01) |

(58) Field of Classification Search
CPC ... H04L 45/308; H04L 45/76; H04L 63/0892;
H04W 4/06; H04W 4/08; H04W 24/02;
H04W 40/02; H04W 84/12; H04W 88/14
See application file for complete search history.

(56) References Cited

U.S. PATENT DOCUMENTS

| | | | |
|---|---|---|---|
| 2015/0249599 A1* | 9/2015 | Song | H04L 45/46 |
| | | | 709/226 |
| 2015/0373626 A1 | 12/2015 | Yi et al. | |
| 2016/0197701 A1 | 7/2016 | Kim | |
| 2017/0163572 A1* | 6/2017 | Cheng | H04L 45/021 |
| 2020/0092121 A1 | 3/2020 | Skillermark et al. | |
| 2020/0154350 A1 | 5/2020 | Dao et al. | |
| 2020/0187106 A1 | 6/2020 | Salkintzis et al. | |
| 2021/0019173 A1 | 1/2021 | Song et al. | |
| 2021/0076318 A1* | 3/2021 | Zong | H04W 8/12 |
| 2021/0321466 A1* | 10/2021 | Colom | H04W 76/10 |
| 2022/0060881 A1* | 2/2022 | Wang | H04L 12/185 |
| 2022/0132311 A1* | 4/2022 | Zhu | H04W 12/06 |
| 2022/0225059 A1* | 7/2022 | Li | H04W 4/08 |
| 2022/0279430 A1* | 9/2022 | Tamura | H04W 12/06 |
| 2023/0109272 A1* | 4/2023 | Ryu | H04L 63/0892 |
| | | | 370/329 |
| 2023/0156828 A1* | 5/2023 | Hu | H04W 76/10 |
| | | | 370/329 |
| 2023/0217240 A1* | 7/2023 | Jung | H04W 8/186 |
| | | | 455/422.1 |
| 2023/0269577 A1* | 8/2023 | Lei | H04W 60/00 |
| | | | 455/411 |
| 2024/0056321 A1* | 2/2024 | Xu | H04L 12/413 |

FOREIGN PATENT DOCUMENTS

| | | |
|---|---|---|
| KR | 10-2125968 B1 | 6/2020 |
| WO | 2021/062579 A1 | 4/2021 |

OTHER PUBLICATIONS

Dong, "Verification Method and Device," English Machine Translation of Dong (CN 111669754 A), Clarivate Analytics, pp. 1-11 (Year: 2025).*
Extended European Search Report dated Jun. 11, 2024, issued in European Patent Application No. 22799052.0-1218.
Nokia, Nokia Shanghai Bell (Rapporteur); Mega CR to clean up, 3GPP TSG-SA2 Meeting #142E, S2-2009068, Nov. 9, 2020.
3GPP TR 23.8xx V0.0.0, 3rd Generation Partnership Project; Technical Specification Group Services and System Aspects; Study on SRVCC enhancements for Transcoding Avoidance (Release 13), Oct. 2014.
International Search Report dated Aug. 1, 2022, issued in International Application No. PCT/KR2022/006089.
Korean Office Action dated Nov. 17, 2025, issued in Korean Patent Application No. 10-2021-0059278.

\* cited by examiner

- Create / Update / Delete a Group
- Create / Update / Delete a member to/from the Group

METHOD AND APPARATUS TO SUPPORT VIRTUAL NETWORK IN WIRELESS COMMUNICATION NETWORK

CROSS-REFERENCE TO RELATED APPLICATION(S)

This application is based on and claims priority under 35 U.S.C. § 119(a) of a Korean patent application number 10-2021-0059278, filed on May 7, 2021, in the Korean Intellectual Property Office, the disclosure of which is incorporated by reference herein in its entirety.

BACKGROUND

1. Field

The disclosure relates to a method and an apparatus for supporting a virtual network (VN) in a wireless communication network. More particularly, the disclosure relates to a method and an apparatus for supporting a virtual network which enable efficient traffic transmission in a wireless communication network.

2. Description of Related Art

5th generation (5G) mobile communication technologies define broad frequency bands such that high transmission rates and new services are possible, and can be implemented not only in "Sub 6 gigahertz (GHz)" bands, such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 terahertz (THz) bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input, multiple output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies, such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and artificial intelligence) from the design stage and internalizing end-to-end AI support functions, and next-generation distributed computing technology for implementing services at levels of complexity exceeding the limit of UE operation capability by utilizing ultra-high-performance communication and computing resources.

If a 3rd generation partnership project (3GPP) network (e.g., a 5th generation system (5GS)) provides a local area network (LAN)-type service, a communication between terminals belonging to the same group needs to be switched within a user plane function (UPF) and ensure that traffic is delivered efficiently.

However, the current 3GPP network (e.g., the 5GS) does not propose a separate scheme for the communication between the terminals belonging to the same group for providing the LAN type-service.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for supporting a virtual network in a wireless communication network.

Another aspect of the disclosure is to provide a method and an apparatus for supporting a virtual network which enable efficient traffic transmission in a wireless communication network.

Additional aspects will be set forth in part in the description which follows and, in part, will be apparent from the description, or may be learned by practice of the presented embodiments.

In accordance with an aspect of the disclosure, a method performed by a first network entity in a wireless communication network is provided. The method includes transmitting, to a second network entity, a first message including data to be used in a plurality of networks included in a virtual network (VN) group, a VN identifier (ID), and group data, and receiving, from the second network entity in response to the first message, a second message including the data to be used in the plurality of networks, the VN ID, the group data, and information indicating a processing result related to the first message.

In accordance with another aspect of the disclosure, a method performed by a second network entity in a wireless communication network is provided. The method includes receiving, from a first network entity, a first message including data to be used in a plurality of networks included in a VN group, a VN ID, and group data, transmitting, to a third network entity, a second message including information related to a network including the second network entity, a network ID of the network, and data to be used in the plurality of networks, receiving, from the third network entity in response to the second message, a third message including the data to be used in the plurality of networks, the information related to the network, and a processing result related to the second message, and transmitting, to the first network entity, a fourth message including the data to be used in the plurality of networks, the VN ID, the group data, and information indicating a processing result related to the first message.

In accordance with another aspect of the disclosure, a first network entity in a wireless communication network is provided. The first network entity includes a transceiver, and at least one processor, wherein the at least one processor is configured to transmit, to a second network entity via the transceiver, a first message including data to be used in a plurality of networks included in a VN group, a VN ID, and group data, and receive, from the second network entity via the transceiver, in response to the first message, a second message including the data to be used in the plurality of networks, the VN ID, the group data, and information indicating a processing result related to the first message.

In accordance with another aspect of the disclosure, a second network entity in a wireless communication network is provided. The second network entity includes a transceiver and at least one processor, and the at least one processor is configured to receive, from a first network entity via the transceiver, a first message including data to be used in a plurality of networks included in a VN group, a VN ID, and group data, transmit, to a third network entity via the transceiver, a second message including information related to a network including the second network entity, a network ID of the network, and data to be used in the plurality of networks, receive, from the third network entity via the transceiver, in response to the second message, a third message including the data to be used in the plurality of networks, the information related to the network, and a processing result related to the second message, and transmit, to the first network entity via the transceiver, a fourth message including the data to be used in the plurality of networks, the VN ID, the group data, and information indicating a processing result related to the first message.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
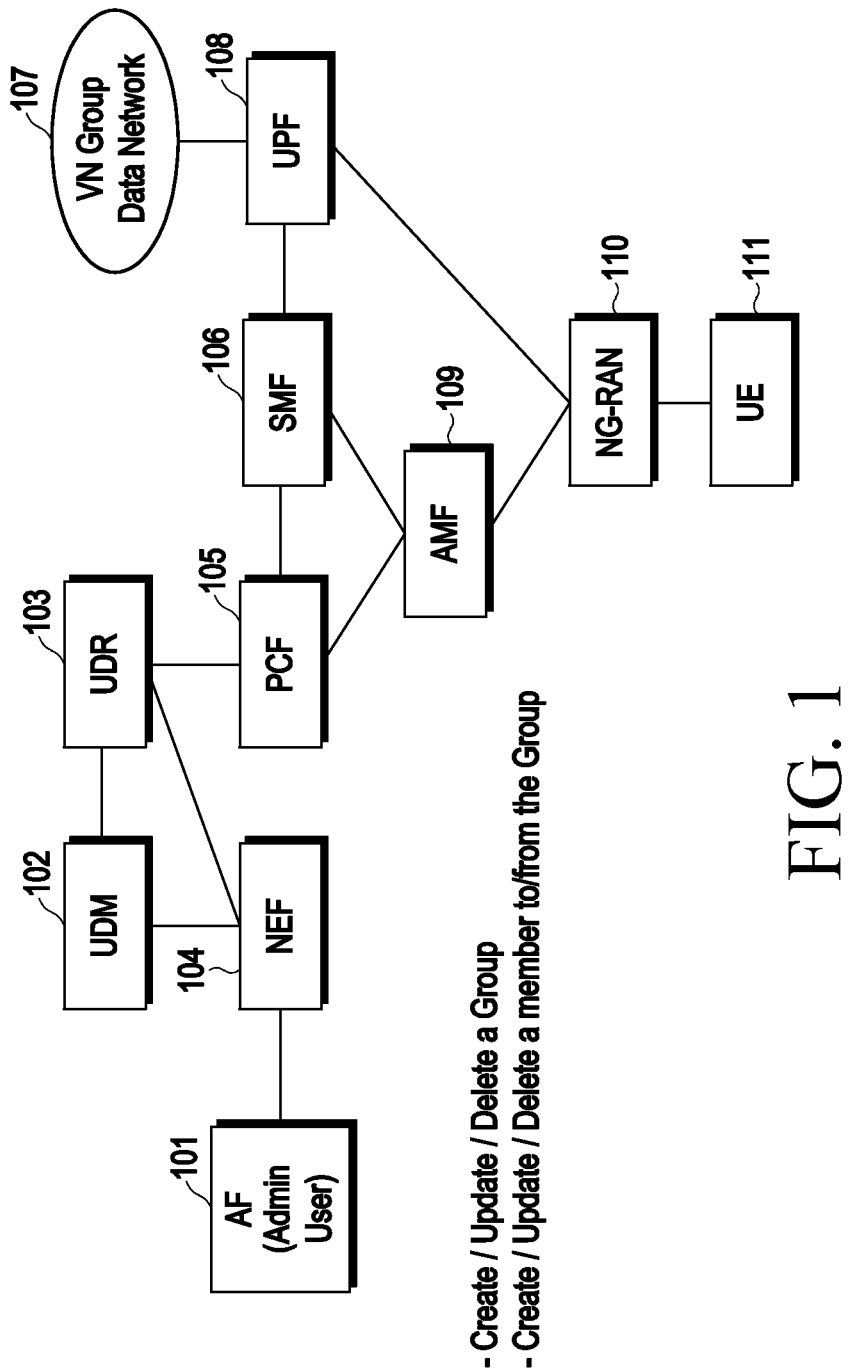
FIG. 1 is a diagram schematically illustrating a group management method for a 5th generation local area network (5G LAN) service in a 5G network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be noted that the technical terms used for describing the disclosure are only used to describe specific embodiments, and are not intended to limit the disclosure. Further, the technical terms used for describing the disclosure should be interpreted to have the same meaning as those commonly understood by a person skilled in the art to which the disclosure pertains, and should not be interpreted have excessively comprehensive or excessively restricted meanings unless particularly defined as other meanings in various embodiments of the disclosure.

Further, when the technical terms used for describing the disclosure are wrong technical terms that cannot correctly represent the idea of the disclosure, it should be appreciated that they are replaced by technical terms correctly understood by those skilled in the art. Further, the general terms used for describing the disclosure should be interpreted as defined in dictionaries or interpreted in the context of the relevant part, and should not be interpreted to have excessively restricted meanings.

In various embodiments of the disclosure, such an expression as "comprises" or "include", and/or the like should not be interpreted to necessarily include all elements or all steps described in the detailed description, and should be interpreted to be allowed to exclude some of them or further include additional elements or steps.

Further, the terms used for the disclosure including an ordinal number, such as expressions "a first" and "a second" may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, various embodiments of the disclosure will be described in detail with reference to the accompanying drawings. Regardless of drawing signs, the same or like elements are provided with the same reference numeral, and a repeated description thereof will be omitted. Further, in describing various embodiments of the disclosure, a detailed description of relevant known technologies will be omitted when it is determined that the description may make the subject matter of the disclosure unclear.

Further, it should be noted that the accompanying drawings are presented merely to help easy understanding of the technical idea of the disclosure, and should not be construed to limit the technical idea of the disclosure. The technical idea of the disclosure should be construed to cover all changes, equivalents, and alternatives, in addition to the drawings.

Hereinafter, a terminal will be described as an example in various embodiments of the disclosure, but the terminal may be referred to as an electronic device, a mobile station (MS), a mobile equipment (ME), a user equipment (UE), a user terminal, a subscriber station (SS), a wireless device, a handheld device, and an access terminal (AT). Further, the terminal may be a device having a communication function, such as, for example, a mobile phone, a personal digital assistant (PDA), a smart phone, a wireless MODEM, a notebook, and/or the like.

The long-term evolution (LTE) system as a representative example of a broadband wireless communication system adopts an orthogonal frequency division multiplexing (OFDM) scheme for a downlink and single carrier frequency division multiple access (SC-FDMA) scheme for an uplink. An uplink means a wireless link where a terminal (e.g., a UE or an MS) transmits data or a control signal to a base station (e.g., an evolved node B (eNode B) or a base station (BS)), and a download means a wireless link where the base station transmits data or a control signals to the terminal. Such multiple access schemes allocate and operate time-frequency resources carrying data or control information per user not to overlap, i.e., to maintain orthogonality among the time-frequency resources, to thereby differentiate each user's data or control information.

A post-LTE communication system, e.g., a 5G communication system, is required to freely reflect various requirements of users, service providers, and/or the like, and thus to support services which meet the various requirements at the same time. Services considered for the 5G communication system include, e.g., an enhanced mobile broadband (eMBB) communication, a massive machine type communication (mMTC), an ultra-reliability low latency communication (URLLC), and/or the like.

The eMBB communication aims to provide a further enhanced data transmission rate as compared with an existing LTE, LTE-A, or LTE-pro. For example, the eMBB communication in the 5G communication system needs to provide a peak data rate of 20 Gbps for a downlink and a peak data rate of 10 Gbps for a uplink in terms of one base station. The 5G communication system is also required to provide an increased user perceived data rate of the terminal while providing the peak data rate.

To meet the various requirements, various transmission/reception techniques, as well as a multiple input multiple output (MIMO) technology, need to further be enhanced. In the LTE system, signals are transmitted and received using a frequency bandwidth of up to 20 MHz in a frequency band of 2 GHz, whereas in the 5G communication system, signals are transmitted and received using a broader frequency bandwidth than 20 MHz in a frequency band ranging 3 GHz to 6 GHz or a frequency band of 6 GHz or more, so a data rate required for the 5G communication system may be met.

The mMTC is also considered to support application services, such as internet of things (IoT) in the 5G communication system. To efficiently provide the IoT, the mMTC is required to support massive UEs in the cell, enhance the coverage of the UE and the battery time, and reduce UE costs. IoT terminals are attached to various sensors or devices to provide communication functionality, and thus, it needs to support a number of UEs in each cell (e.g., 1,000,000 UEs/km²). Since mMTC-supportive UEs, by the nature of service, are highly likely to be located in shadow areas not covered by the cell, such as the underground of a building, it may require much broader coverage as compared with other services that the 5G communication system provides. mMTC-supportive UEs, due to the need for being low cost and difficulty in frequently exchanging batteries, may be required to have a very long battery life, such as 10 to 15 years.

The URLLC is a cellular-based wireless communication service used for a specific purpose (mission-critical). For example, the URLLC may consider a service used for remote control for robots or machinery, industrial automation, unmanned aerial vehicles, remote health care, emergency alerts, and/or the like. So, a communication provided by the URLLC needs to provide ultra-low latency and ultra-high reliability. For example, a service supporting the URLLC needs to meet an air interface latency of less than 0.5 milliseconds simultaneously with a packet error rate (PER) of $10^{-5}$ or less. Thus, for the service supporting the URLLC, the 5G communication system may be required to be designed to provide a shorter transmit time interval (TTI) than those for other services and allocate a broad resource in a frequency band for ensuring reliability for a communication link.

The aforementioned three services, i.e., the eMBB, the URLLC, and the mMTC may be multiplexed and transmitted in one system. At this time, for meeting different requirements for each of services, different transmission and reception scheme and transmission and reception parameters may be used among the services. The 5G communication system is not limited to the above-described three services.

The description of embodiments of the disclosure focuses primarily on a radio access network, new RAN (NR), and a core network, packet core (5G system, or 5G core network, or next generation core (NG core)), which are specified by 3rd generation partnership project (3GPP) which is a mobile communication standardization organization. However, the subject matter of the disclosure, or slight changes thereto, may also be applicable to other communication systems which share similar technical backgrounds without departing from the scope of the disclosure, which would readily be appreciated by one of ordinary skill in the art.

For ease of description, some of the terms or names defined in 3GPP long-term evolution (LTE) standards (standards for 5G, NR, LTE, or similar systems) may be used.

However, the disclosure is not limited by such terms and names and may be likewise applicable to systems conforming to other standards.

It will be noted that as used herein, terms for identifying access nodes, terms denoting network entities, terms denoting messages, terms denoting inter-network entity interfaces, and terms denoting various pieces of identification information are provided as an example for ease of description. Thus, various embodiments of the disclosure are not limited by the terms used for describing the disclosure, and such terms may be replaced with other terms denoting objects with equivalent technical concept.

For convenience of a description, terms and names defined in a 5<sup>th</sup> generation system (5GS) and new radio (NR) standard defined by 3GPP are used in various embodiments of the disclosure. However, various embodiments of the disclosure are not limited by the terms and the names defined in the 5GS and NR standard, and may be equally applicable to wireless communication networks conforming to other standards. More particularly, various embodiments of the disclosure may be applied to 3GPP 5GS/NR (a 5th generation mobile communication standard).

First, if a 3GPP network (e.g., a 5GS) provides a local area network (LAN)-type service, a communication between terminals belonging to the same group is switched within a user plane function (UPF), so traffic is delivered efficiently. For this, there is a need for a scheme for configuring a group within the 3GPP network (e.g., the 5GS), registering and managing terminals in the group, and switching traffic between terminals in the same group within the same UPF.

In a LAN-type service, one group may be configured across a plurality of networks due to a characteristic of the LAN-type service. More particularly, the LAN-type service may support transmission of traffic more efficiently if the one group is configured across a plurality of networks which are physically located in the same location or a plurality of networks which are logically separated. For this, in the LAN-type service, it may be an important factor to additionally recognize whether a corresponding group is a group configured across a plurality of networks and which UPF needs to be used for efficient transmission.

In an embodiment of the disclosure, a 5GS supports an Ethernet-type protocol data unit (PDU) session, and in this case, the 5GS provides UEs with a 5G LAN-type service. An efficient communication may be provided between UEs belonging to the same LAN, so an embodiment of the disclosure proposes a scheme in which a group is configured in the 5GS and the configured group belongs to the same LAN so that the UEs recognize that the UEs belong to the same LAN.

FIG. 1 is a diagram schematically illustrating a group management method for a 5G LAN service in a 5G network according to an embodiment of the disclosure.

Before describing FIG. 1, 5G VN group management in an embodiment of the disclosure will be described as follows.

First, a 5G system supports management of 5G VN group identification and membership (i.e., 5G VN group identifiers and membership), and 5G VN group data (i.e., definition of 5G VN group data). The 5G VN group management may be configured by a network manager or may be dynamically managed by an application function (AF).

A 5G VN group may be characterized by at least one of the following:

(1) 5G VN group identifiers (IDs): an external group ID and an internal group ID used to identify the 5G VN group

(2) 5G VN group membership: 5G VN group members are uniquely identified by a generic public subscription identifier (GPSI). The 5G VN group is applicable to 5G LAN-type services.

(3) 5G VN group data: information related to a PDU session type, a DNN, S-NSSAI and an application descriptor, and secondary authentication/authorization (for example, for enabling internet protocol (IP) address allocation by a DN-AAA).

In an embodiment of the disclosure, to support 5G VN group identification and dynamic management of membership, an NEF may disclose a set of services to manage (e.g., to add/delete/modify) 5G VN groups and 5G VN members The NEF may also disclose services to dynamically manage 5G VN group data.

In an embodiment of the disclosure, a 5G VN group is identified by AF using an external group ID. The NEF provides a UDM with the external group ID. The UDM maps the external group ID and an internal group ID. For a newly created 5G VN group, an internal group ID is allocated by the UDM.

The NEF may retrieve the internal group ID from the UDM through a Nudm_SDM_Get service operation. Here, the Nudm_SDM_Get service operation may be based on an external group ID and group identifier translation.

In an embodiment of the disclosure, the external group ID for the 5G VN group corresponds to a unique set of 5G VN group data parameters. 5G VN group configuration is provided by OA&M, or provided by an AF to the NEF.

In an embodiment of the disclosure, a description of 5G VN group data may be shown in Table 1 below.

TABLE 1

| Parameters | Description |
| --- | --- |
| DNN | DNN for the 5G VN group |
| S-NSSAI | S-NSSAI for the 5G VN group |
| PDU Session Type | PDU Session Types allowed for 5G VN group |
| Application descriptor | There may be multiple instances of this information; this information may be used to build URSP sent to 5G VN group members (NOTE 1) |
| Information related with secondary authentication/ authorization | This may indicate: - the need for secondary authentication/authorization; - the need for SMF to request the UE IP address from the DN-AAA server. If at least one of secondary authentication/authorization or DN-AAA UE IP address allocation is needed, the AF may provide DN-AAA server addressing information. |

NOTE 1:
The PCF may be configured with a mapping from Application Descriptor to other information required to construct the URSP rules, e.g., IP filters and SSC (session and service continuity) mode.

In Table 1, an SSC mode may include SSC mode 1, SSC mode 2, and SSC mode 3.

Referring to FIG. 1, a 5G network may include an application function (AF) 101, a unified data management (UDM) 102, a unified data repository (UDR) 103, a network exposure function (NEF) 104, a policy control function (PCF) 105, a session management function (SMF) 106, a virtual network (VN), a group data network 107, a user plane function (UPF) 108, an access and mobility management function (AMF) 109, a next generation radio access network: NG-RAN) 110, and a UE 111. Names of network entities, such as the AF 101, the UDM 102, the UDR 103, the NEF 104, the PCF 105, the SMF 106, the VN group data network 107, the UPF 108, the AMF 109, and the NG-RAN 110 in FIG. 1 may be also changed.

The AF 101 may generate, modify, or delete a group. In addition, the AF 101 may generate, modify, or delete a member included in the group. Accordingly, if the AF 101 intends to generate, modify, or delete the group, the AF 101 may transmit, to the NEF 104, a message requesting to generate, modify, or delete the group. If the AF 101 intends to generate, modify, or delete the member included in the group, the AF 101 may transmit, to the NEF 104, a message requesting to generate, modify, or delete the member included in the group. In an embodiment of the disclosure, a message requesting to generate a group will be referred to as a "group generation request message", a message requesting to modify a group will be referred to as a "group modification request message", and a message requesting to delete a group will be referred to as a "group deletion request message". In an embodiment of the disclosure, a message requesting to generate a group member will be referred to as a "group member generation request message", a message requesting to modify a group member will be referred to as a "group member modification request message", and a message requesting to delete a group member will be referred to as a "group member deletion request message".

The NEF 104 transmits a parameter provisioning message to the UDM 102 corresponding to a request message from the AF 101. The UDM 102 may read necessary information from the UDR 103. In addition, the UDM 102 may update specific information in the UDR 103. The UDM 102 transmits, to the NEF 104, a response message to a message from the NEF 104, e.g., the parameter provisioning message.

The NEF 104 transmits a response message to the request message to the AF 101.

Meanwhile, if an update on specific information occurs in the UDR 103, the UDM 102 informs a necessary network function (NF) that information has been updated through a notification message.

In an embodiment of the disclosure, a group generation request message, a group modification request message, or a group deletion request message transmitted by the AF 101 may include at least one of the following.

(1) External group identifier (ID): an ID identifying a VN (2) Group data

In an embodiment of the disclosure, group data may include at least one of the following.

(1) Data network name (DNN): a name of a network for a supported 5G VN (2) Single network slice selection assistance information (S-NSSAI): information about a network slice for a 5G VN group (3) Application descriptor: application characteristic information to be used for a user routing selection policy (URSP) to be transmitted to 5G VN group members. The application descriptor may include a plurality of information instances.

(4) Secondary authentication/authorization-related information: DN-authentication/authorization/accounting (AAA) server address information. The secondary authentication/authorization-related information may be information related to secondary authentication and authorization, and may include a DN-AAA server address. The secondary authentication/authorization-related information may be used if secondary authentication/authorization is required to use a DN, or if an SMF needs to request a UE internet protocol (IP) address from a DN-AAA server.

In an embodiment of the disclosure, a group member generation request message, a group member modification request message, or a group member deletion request message transmitted by the AF 101 may include at least one of the following.

(1) External group ID: an ID distinguishing a VN (2) List of generic public subscription identifier (GPSI): a list including 5G VN group members. Each group member included in the list of GPSI may be specified as a GPSI.

Meanwhile, the UDR 103 may notify the PCF 105 of updated 5G VN group configuration information, for example, a DNN, S-NSSAI, and a PDU session type. The PCF 105 may generate URSP information based on the 5G VN group configuration information notified from the UDR 103, and update the generated URSP information in the UE in a group specified by the AF 101 by a GPSI. In addition, the UDM 102 may update specific information in the UDR 103.

Meanwhile, as described above, if the update on the specific information occurs in the UDR 103, the UDM 102 may transmit subscription information including 5G VN group data to the AMF 109 and the SMF 106 based on the updated information. In an embodiment of the disclosure, the subscription information may be transmitted through a notification message.

Figure 2:
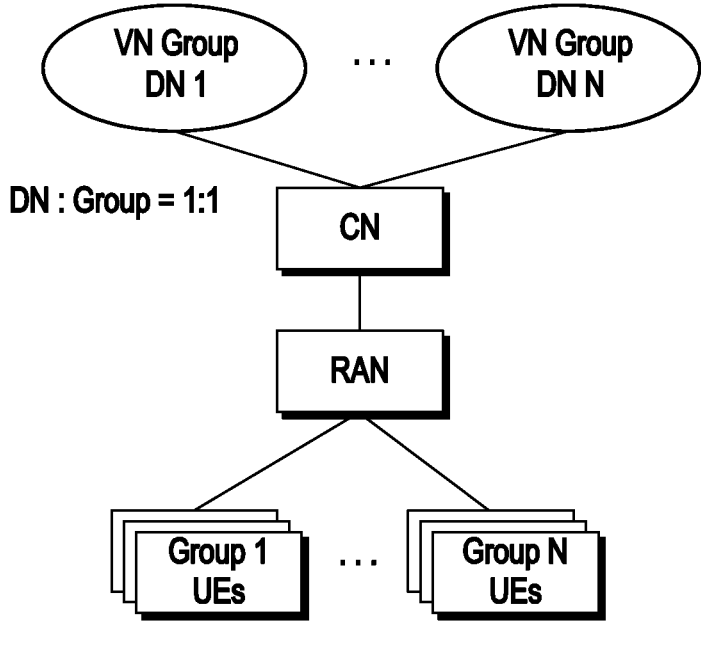
FIG. 2 is a diagram schematically illustrating a method for discovering and selecting a 5G LAN service in a 5G network according to an embodiment of the disclosure.

FIG. 2 is a diagram schematically illustrating a method for discovering and selecting a 5G LAN service in a 5G network according to an embodiment of the disclosure.

Referring to FIG. 2, a combination of a DNN and S-NSSAI and a 5G VN indicating a group have a 1:1 relationship, so a UE desiring to transmit traffic within a specific group generates a PDU session using a corresponding DNN and S-NSSAI based on a URSP. A case in which a total of N VN groups, for example, a VN group corresponding to a DN 1 to a VN group corresponding to a DN N, exist has been illustrated in FIG. 2.

Figure 3:
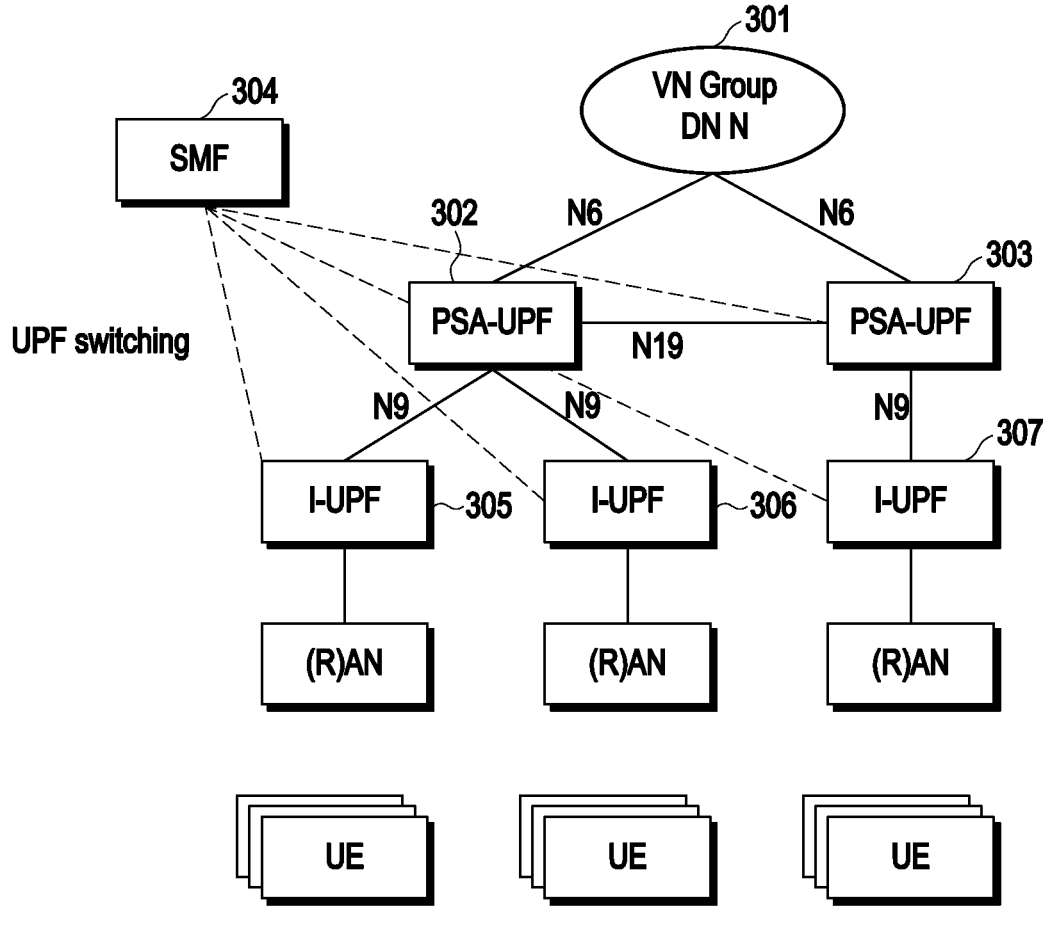
FIG. 3 is a diagram schematically illustrating a method for supporting a communication within a 5G LAN group in a 5G network according to an embodiment of the disclosure.

FIG. 3 is a diagram schematically illustrating a method for supporting a communication within a 5G LAN group in a 5G network according to an embodiment of the disclosure.

Referring to FIG. 3, if a UE requests generation of a PDU session using a DNN and S-NSSAI for traffic transmission within a specific VN group, an SMF may determine whether to use a PDU session anchor (PSA) UPF performing a function related to PDU session generation. The SMF enables traffic between UEs in the same VN group to be switched in the same PSA UPF based on a result of determining whether to use the PSA UPF.

Meanwhile, if a size of a VN group increases and there are a plurality of, for example, two or more PSA UPFs in the VN group, traffic transmission within one group may be performed through switching between the PSA UPFs. In this case, an N19 interface between PSA UPFs is used. In this way, if the traffic transmission within the one group is performed through switching between the PSA UPFs, the SMF which is the highest NF knows all related information.

A case in which two PSA UPFs are included in one VN group and the SMF manages the two PSA UPFs has been illustrated in FIG. 3. For example, a PSA UPF 302 and a PSA UPF 303 exist in a VN group 301. The PSA UPF 302 and the PSA UPF 303 are connected to the SMF 304, and the SMF 304 may perform traffic transmission within the VN group 301 through switching between the PSA UPF 302 and the PSA UPF 303. In addition, the PSA UPF 302 is connected to two intermediate-UPFs (I-UPFs), for example, an I-UPF 305 and an I-UPF 306. The PSA UPF 303 is connected to one I-UPF, for example, an I-UPF 307.

Figure 4:
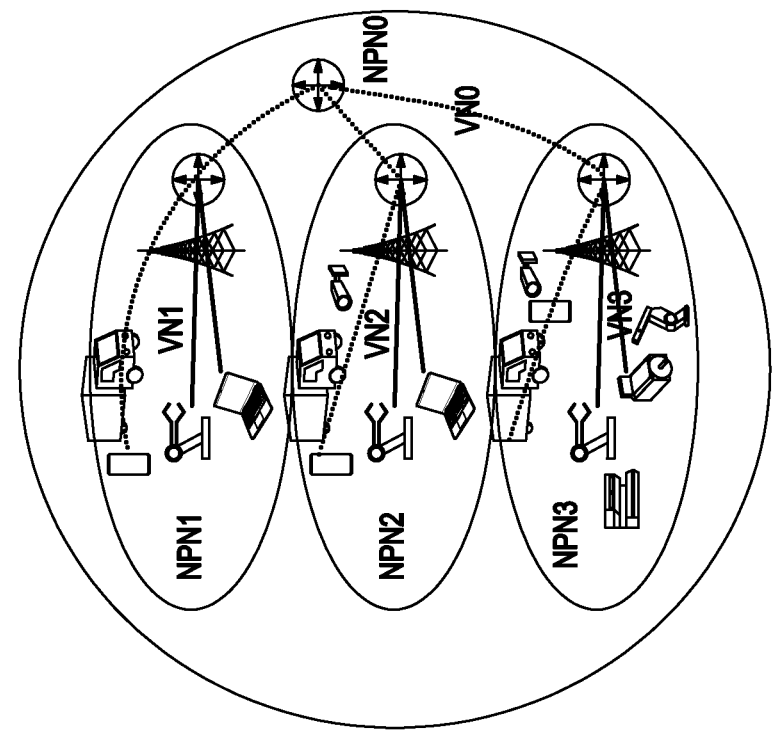
FIG. 4 is a diagram schematically illustrating a factory building and factory complex scenario in a 5G network according to an embodiment of the disclosure.
Figure 4:
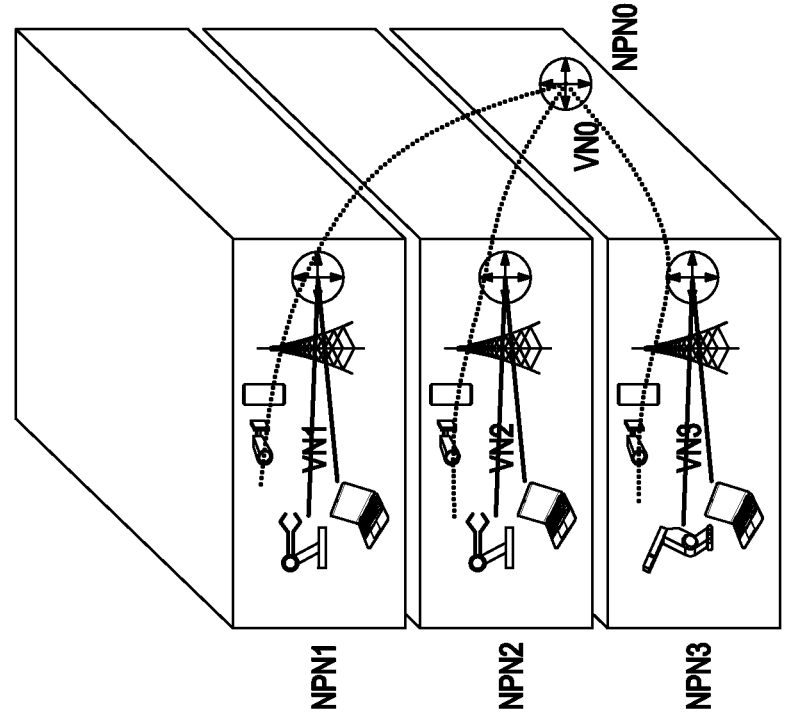

FIG. 4 is a diagram schematically illustrating a factory building and factory complex scenario in a 5G network according to an embodiment of the disclosure.

Referring to FIG. 4, in a case of a factory building, a plurality of factories are included in one building. For example, there may be one factory on each floor in the building. Each factory has its own dedicated network, and for this, a separate non-public network (NPN) may be used. UEs supporting each quality of service (QoS) within a corresponding NPN may be generated as a group and configured as a separate 5G VN. For example, a corresponding 5G VN may be configured for motion control or for logistics.

Further, a 5G VN which provides the same service and includes all floors within one building may be configured. For example, a manager's terminal in charge of a space between floors, a terminal having a monitoring function in charge of all floors, a terminal in charge of a logistics function moving within the entire building, or the like, may be an example of UEs included in the same 5G VN within the building.

In a case of a factory complex, a plurality of factories may exist within one complex. For example, there may be one factory for each block within the complex. Each factory has its own dedicated network, and a separate NPN may be used for this. UEs supporting each QoS in a corresponding NPN can be generated as a group and configured as a separate 5G VN. For example, a corresponding 5G VN may be configured for motion control or for logistics.

In addition, a 5G VN which provides the same service and includes all blocks in one complex may be configured. For example, a terminal of a manager who needs to move between blocks, a terminal having a monitoring function in charge of all blocks, a terminal in charge of a logistics function moving within the entire complex, or the like, may be an example of UEs included in the same 5G VN within the complex.

In order to support an example of a factory building and factory complex scenario as described in FIG. 4, group management needs to be supported across a plurality of networks.

However, if a DNN and S-NSSAI requested by an AF in a 5G network are generated considering that the DNN and the S-NSSAI are used only in one network, a DNN and S-NSSAI which may be used in a plurality of networks needs to be newly considered.

In addition, an external ID requested by the AF in the 5G network may be also be used for only one network, so an external ID which may be used in a plurality of networks needs to be newly considered for supporting the plurality of networks. In particular, if the same VN group is supported across a plurality of networks which are physically located in the same place or logically separated, a scheme of indicating a UPF used for transmission of traffic needs to be newly considered for efficiently supporting the transmission of traffic.

In an embodiment of the disclosure, an AF may additionally support at least one of the following.

Enhanced VN (eVN) network ID: an ID of a network in which a UPF to which traffic to be used in a plurality of networks, for example, the entire network will be transmitted is located. In an embodiment of the disclosure, the plurality of networks may be all existing networks, and may be included in a specific VN group.

eVN S-NSSAI: S-NSSAI of a network in which a UPF to which traffic to be used in a plurality of networks will be transmitted is located eVN DNN: a DNN of a network in which a UPF to which traffic to be used in a plurality of networks will be transmitted is located eVN ID: an ID for identifying a VN to be used in a plurality of networks In an embodiment of the disclosure, each network may separately designate S-NSSAI and a DNN to be used in a plurality of networks, for example, all networks. For example, each network uniquely designates the S-NSSAI and the DNN to be used in the plurality of networks, so combinations of a plurality of S-NSSAIs and DNNs may be mapped to one 5G VN.

In an embodiment of the disclosure, a 5G VN may be identified by specifying the 5G VN supporting a plurality of networks, for example, all networks with a combination of an eVN Network ID, eVN S-NSSAI, and an eVN DNN, so a 1:1 mapping relationship may be established between a combination of the eVN Network ID, the eVN S-NSSAI, and the eVN DNN and the 5G VN supporting the entire networks. For example, in an embodiment of the disclosure, the following relationships may be established.

S-NSSAI and DNN: Group=M:1 eVN Network ID, eVN S-NSSAI and eVN DNN: Group=1:1

Herein, Group represents a 5G VN supporting the entire networks.

In an embodiment of the disclosure, an SMF in each network may specify a UPF, for example, a PSA UPF, for receiving and switching traffic of the entire networks using an eVN Network ID, eVN S-NSSAI, and an eVN DNN.

In an embodiment of the disclosure, an AF may specify an external group ID which specifies a 5G VN. In addition, each network needs to have a DNN and S-NSSAI separately, so the AF may additionally specify a DNN and S-NSSAI to be used in each network.

Figure 5:
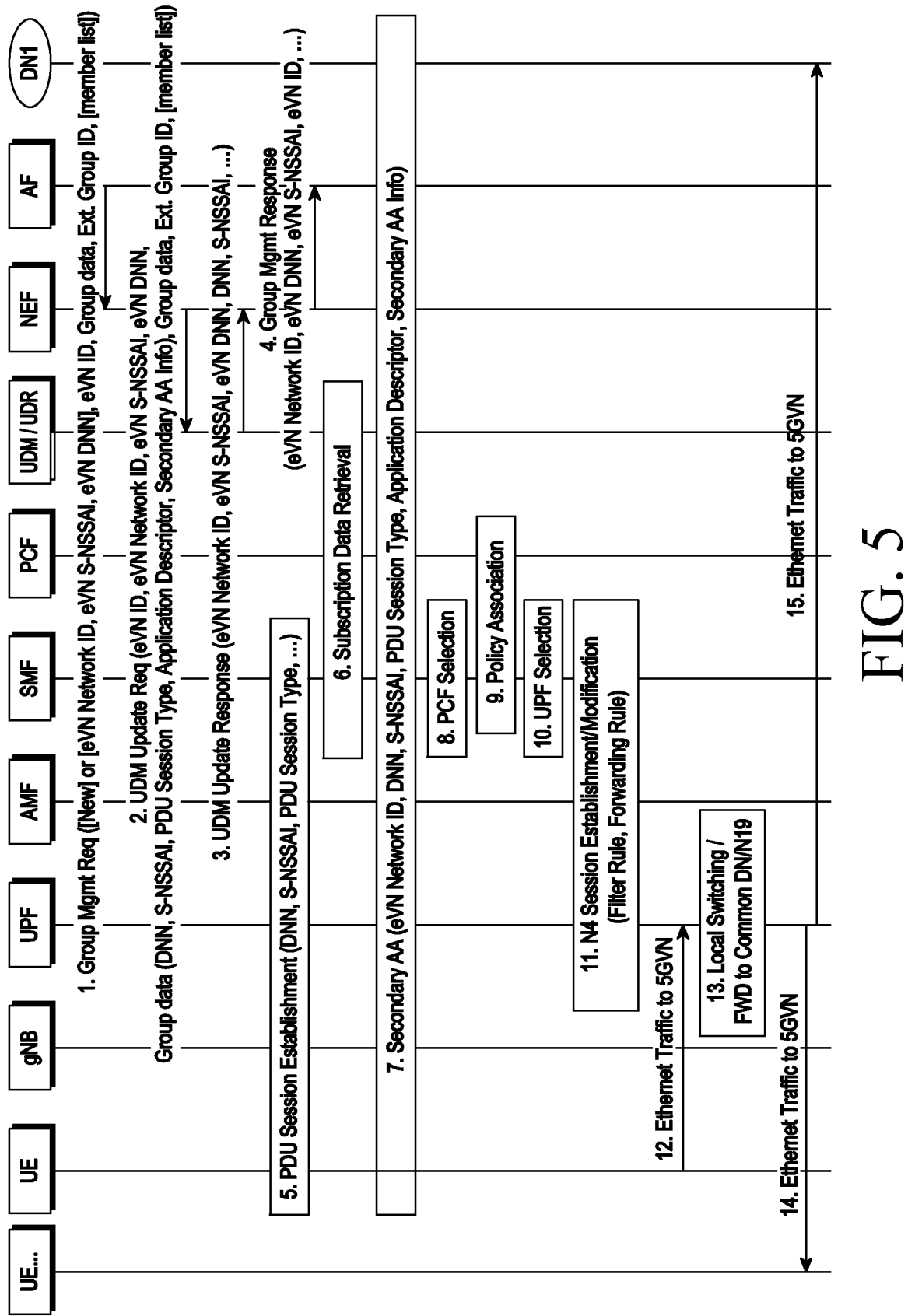
FIG. 5 is a diagram schematically illustrating a procedure for configuring a VN spanning a plurality of networks in a first network in a wireless communication network according to an embodiment of the disclosure.

FIG. 5 is a diagram schematically illustrating a procedure for configuring a VN spanning a plurality of networks in a first network in a wireless communication network according to an embodiment of the disclosure.

Referring to FIG. 5, in step 1, an AF transmits, to an NEF, group management request (group mgmt req) message including at least one of data to be used in the entire networks, for example, a plurality of networks included in a 5G VN, an eVN ID, and group data. Here, the AF may select the data to be used in the entire networks, for example, the plurality of networks included in the VN as follows.

(1) The AF may include at least one of an eVN Network ID, eVN S-NSSAI, or an eVN DNN to be used in the entire networks in the group management request message.

(2) The AF may not include a separate parameter in the group management request message, or may include "New" which is an indicator indicating that new parameters will be included.

Upon receiving the group management request from the AF, the NEF transmits a UDM update request (UDM Update Req) message to the UDM in step 2. The UDM update request message may include at least one of a DNN and S-NSSAI allocated in a network in which the NEF is included and a network ID of a corresponding network, and the eVN DNN, the eVN S-NSSAI, and the eVN DNN received through the group management request message.

Meanwhile, in step 1, the AF may transmit a group member addition request message or a group member deletion request message for adding or deleting a member in the group. The group member addition request message or the group member deletion request message may include at least one of the following.

(1) External group ID: an ID identifying a VN within a network (2) List of GPSI: a 5G VN group member list, and each group member included in a 5G VN group member list may be specified by a GPSI.

In addition, in step 2, the NEF may transmit a request message to the UDM, and the request message may include at least one of the following.

(1) Information to be used in the entire network: an eVN ID, an eVN Network ID, an eVN DNN, and eVN S-NSSAI.

(2) Information to be used in a corresponding network: group data (a DNN, S-NSSAI, a PDU session type, an application descriptor, and secondary AAA Information)

The UDM may read necessary data from a UDR, and may store updated information in the UDR. The UDR may inform a PCF of the updated information through a notification message. Upon receiving the notification message including the updated information from the UDR, the PCF may transmit a URSP update message to UEs specified by a GPSI received from the AF. The UDM may transmit a notification message including the updated information to an AMF or an SMF.

Upon receiving the UDM update request message from the NEF, the UDM transmits a UDM update response (UDM Update Rsp) message which is a response message to the UDM update request message to the NEF in step 3. The UDM update response message may include at least one of the following.

(1) Information to be used in the entire network: an eVN ID, an eVN Network ID, an eVN DNN, and eVN S-NSSAI (2) Information to be used in a corresponding network: group data (a DNN, S-NSSAI, a PDU session type, an application descriptor, and secondary AAA information)

(3) Processing result and reason why processing is impossible: a processing result for a UDM update request, and a reason why processing is impossible if it is impossible to process the UDM update request.

Upon receiving the UDM update response message from the UDM, in step 4, the NEF transmits, to the AF, a group management response (group mgmt Rsp) message which is a response message to the group management request message received in step 1. The group management response message may include one of the following.

(1) Information to be used in the entire network: an eVN ID, an eVN Network ID, an eVN DNN, and eVN S-NSSAI (2) Information to be used in a corresponding network: Group Data (a DNN, S-NSSAI, a PDU Session Type, an Application Descriptor, and Secondary AAA Information)

(3) Processing result and reason why processing is impossible: a processing result for a group management request, and a reason why processing is impossible if it is impossible to process the group management request.

In step 5, a UE establishes a PDU session using a corresponding DNN and S-NSSAI with reference to the URSP (PDU Session Establishment).

In step 6, the SMF may retrieve subscription information, for example, subscription data from the UDM (subscription data retrieval). The SMF may identify whether the UE is joined to a group specified by the DNN and the S-NSSAI.

In step 7, the SMF may perform a secondary authentication/authorization process if necessary based on the information retrieved from the UDM in step 6 (Secondary AA). In the secondary authentication/authorization process, an eVN Network ID, a DNN, S-NSSAI, a PDU session type, an application descriptor, and secondary AA information may be used. In the secondary authentication/authorization process, the additional information may be exchanged with the UE to perform authentication up to a DN-AAA, and a detailed description of the Secondary Authentication/Authorization process will be omitted.

In step 8, the SMF selects a PCF based on the subscription information retrieved from the UDM in step 6 (PCF Selection).

In step 9, the SMF performs a policy association operation with the PCF. Thereafter, the SMF may transmit and receive policy association information for a corresponding PDU session to and from the PCF.

In step 10, the SMF selects a UPF which processes traffic for a 5G VN mapped to a DNN and S-NSSAI based on the information, e.g., the subscription information, received from the UDM in step 6, the information, e.g., the policy association information for the PDU session, received from the PCF in step 9, and/or the like (UPF Selection).

In step 11, the SMF establishes or modifies an N4 session with the UPF (N4 session establishment/modification). In this case, the SMF may transmit a filter rule for classifying traffic and a forwarding rule specifying how to forward the classified traffic. In this case, a response to the PDU Session Establishment request started in step 5 may be transmitted to the UE and a next generation nodeB (gNB). Here, the gNB is a network infrastructure which provides UEs with a radio access. The gNB has a coverage defined as a certain geographic area based on a distance within which a signal may be transmitted. It will be noted that the gNB may be referred to as an 'access point (AP)', an 'eNodeB (eNB)', a '5th generation node (5G node)', a 'wireless point', a 'transmission/reception point (TRP)', or other terms having an equivalent technical meaning as well as a 'base station (BS)'.

In addition, the gNB may be a network entity including at least one of an integrated access and backhaul (IAB)-donor which is a gNB which provides UEs with a network access through a network of backhaul and access links, and an IAB-node which is a radio access network (RAN) node supporting NR access links to UEs and supporting NR backhaul links to the IAB-donor or another IAB-node in a new radio (NR) system. The UE may transmit and receive data to and from an IAB-donor which is wirelessly accessed through an IAB-node and connected to at least one IAB-node via a backhaul link. Base stations may provide a radio access according to one or more radio protocols, e.g., a 5G 3GPP new air interface/access (NR), LTE, LTE-A, HSPA, Wi-Fi 802.11a/b/g/n/ac, and/or the like.

In step 12, the UE transmits traffic delivered to a 5GVN to the UPF (Ethernet Traffic to 5GVN).

In step 13, the UPF classifies the traffic received from the UE based on the filter rule received from the SMF in step 11, and delivers the classified data based on the forwarding rule received from the SMF in step 11 according to a result of classifying (local switching/FWD to common DN/N19). If the traffic received from the UE needs to be transmitted to another UE within a group in which the UPF exists, the traffic received from the UE may be locally switched within the UPF. On the other hand, if the traffic received from the UE needs to be transmitted to a terminal outside the group in which the UPF exists, the traffic received from the UE may be transmitted to another UPF through an N19 interface or to a DN through an N6 interface.

In step 14, the UPF transmits traffic to another UE according to the result determined in step 13. For example, if the traffic received from the UE needs to be transmitted to another UE within the group in which the UPF exists, the UPF may transmit the traffic to the other UE through local switching within the UPF.

In step 15, the UPF transmits traffic to a DN according to the result determined in step 13. For example, if the traffic received from the UE needs to be transmitted to the terminal outside the group in which the UPF exists, the UPF transmits the traffic to the other UPF through the N19 interface or to the DN through the N6 interface.

Figure 6A:
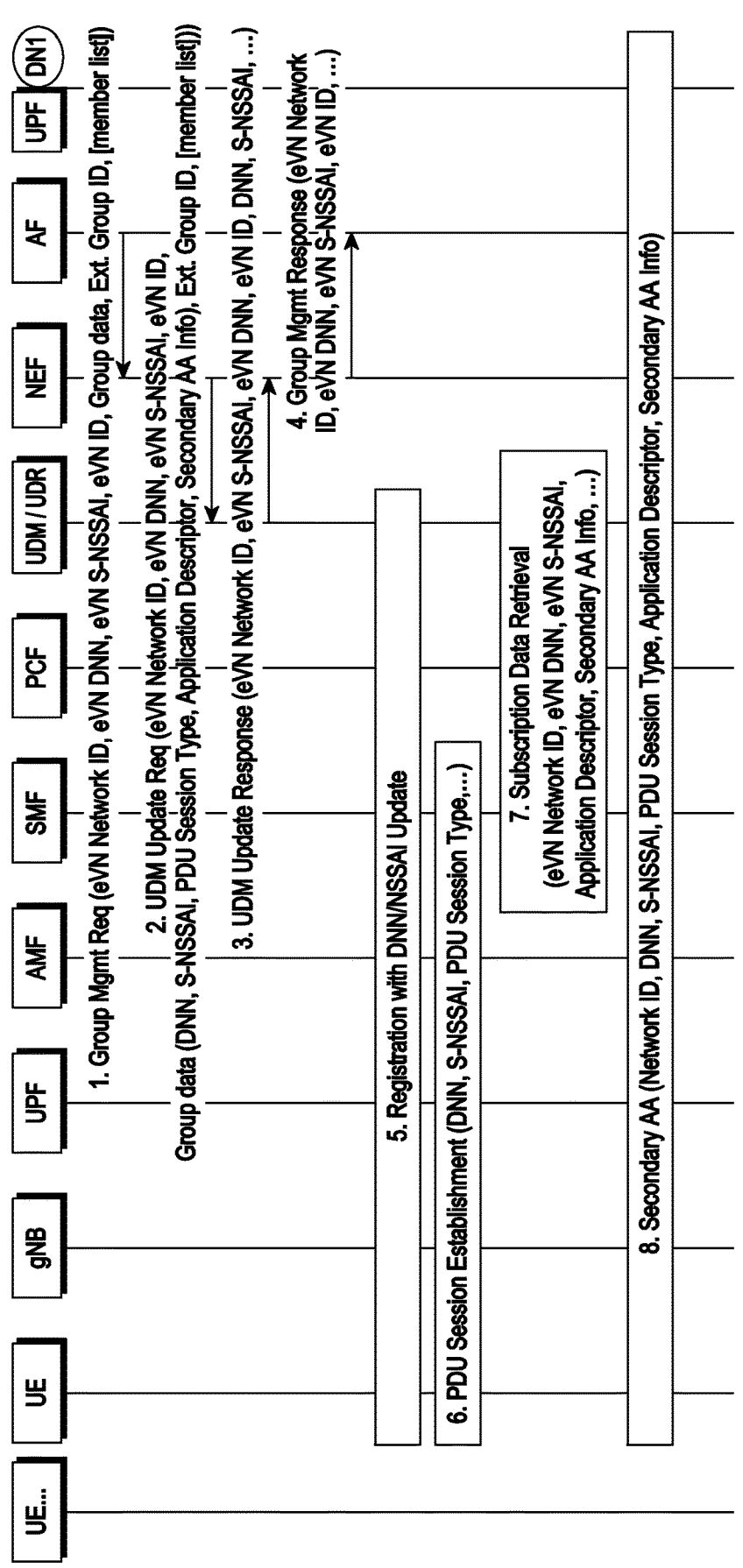
FIGS. 6A and 6B are diagrams schematically illustrating a procedure for configuring a VN spanning a plurality of networks in a second and subsequent networks in a wireless communication network according to various embodiments of the disclosure.
Figure 6B:
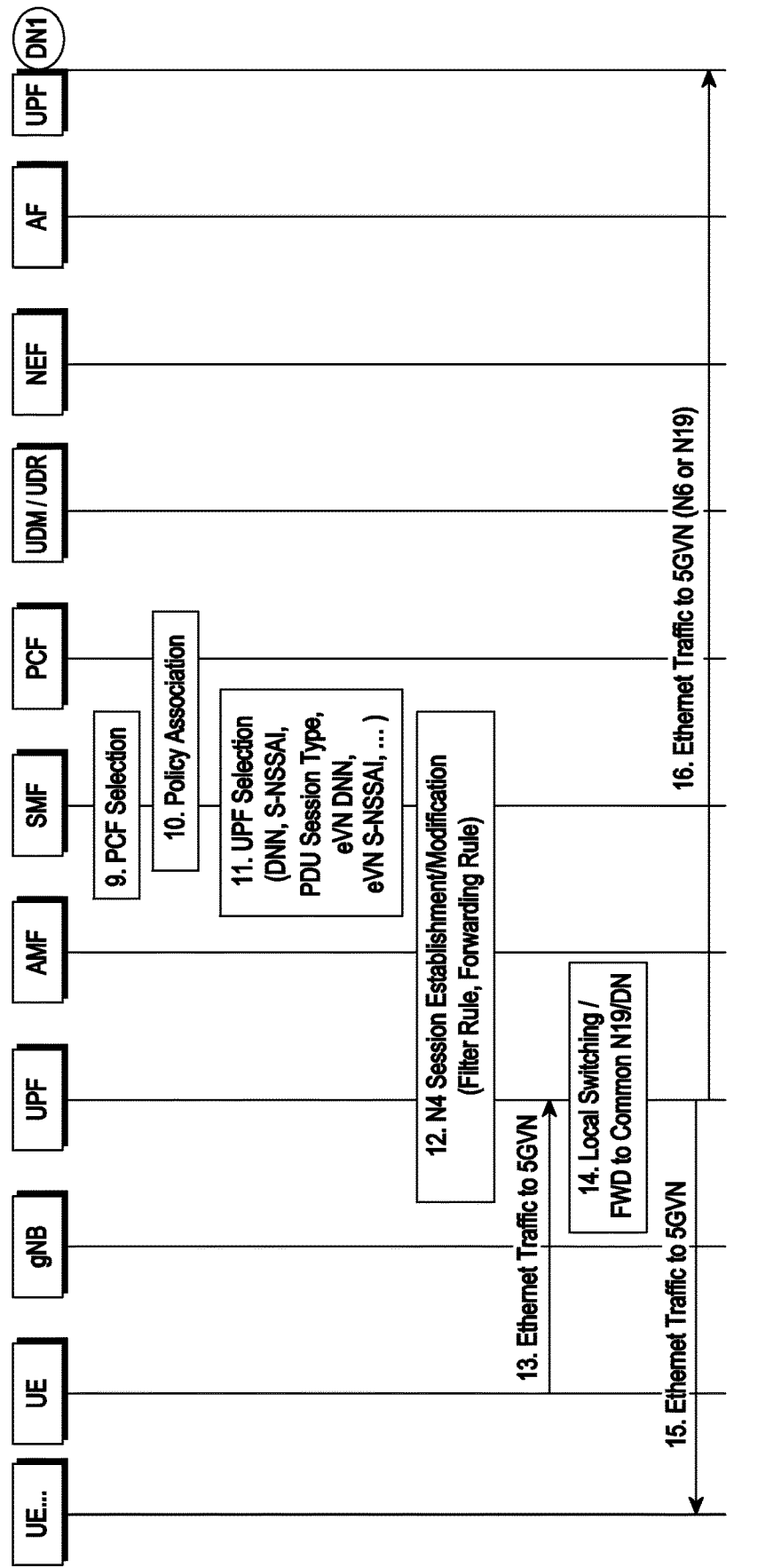

FIGS. 6A and 6B are diagrams schematically illustrating a procedure for configuring a VN spanning a plurality of networks in a second and subsequent networks in a wireless communication network according to various embodiments of the disclosure.

Referring to FIGS. 6A and 6B, in step 1, an AF transmits, to an NEF, a group management request (group mgmt req) message including at least one of data to be used in the entire networks, for example, a plurality of networks included in a VN, an eVN ID, and group data. Here, the AF may include the data to be used in the entire networks, for example, the plurality of networks included in the VN.

The AF may include at least one of eVN S-NS SAI, an eVN DNN, or eVN network ID to be used in the entire networks in the group management request message.

Upon receiving the group management request from the AF, the NEF transmits a UDM update request (UDM update req) message to the UDM in step 2. The UDM update request message may include a DNN and S-NSSAI allocated in a network in which the NEF is included and a network ID of a corresponding network, and the eVN DNN, the eVN S-NSSAI, and the eVN DNN received through the group management request message.

Meanwhile, in step 1, the AF may transmit a group member addition request message or a group member deletion request message for adding or deleting a member in the group. The group member addition request message or the group member deletion request message may include at least one of the following.

(1) External group ID: an ID identifying a VN within a network (2) List of GPSI: a 5G VN group member list, and each group member included in a 5G VN group member list may be specified by a GPSI.

In addition, in step 2, the NEF may transmit a request message to the UDM, and the request message may include at least one of the following.

(1) Information to be used in the entire network: an eVN ID, an eVN Network ID, an eVN DNN, and eVN S-NSSAI.

(2) Information to be used in a corresponding network: group data (a DNN, S-NSSAI, a PDU session type, an application descriptor, and secondary AAA information)

The UDM may read necessary data from a UDR, and may store updated information in the UDR. The UDR may inform a PCF of the updated information through a notification message. Upon receiving the notification message including the updated information from the UDR, the PCF may transmit a URSP update message to UEs specified by a GPSI received from the AF. The UDM may transmit a notification message including the updated information to an AMF or an SMF.

Upon receiving the UDM update request message from the NEF, the UDM transmits a UDM update response (UDM update rsp) message which is a response message to the UDM update request message to the NEF in step 3. The UDM update response message may include at least one of the following.

(1) Information to be used in the entire network: an eVN ID, an eVN network ID, an eVN DNN, and eVN S-NSSAI (2) Information to be used in a corresponding network: group data (a DNN, S-NSSAI, a PDU session type, an application descriptor, and secondary AAA information)

(3) Processing result and reason why processing is impossible: a processing result for a UDM update request, and a reason why processing is impossible if it is impossible to process the UDM update request.

Upon receiving the UDM update response message from the UDM, in step 4, the NEF transmits, to the AF, a group management response (group mgmt rsp) message which is a response message to the group management request message received in step 1. The group management response message may include one of the following.

(1) Information to be used in the entire network: an eVN ID, an eVN Network ID, an eVN DNN, and eVN S-NSSAI (2) Information to be used in a corresponding network: group data (a DNN, S-NSSAI, a PDU session type, an application descriptor, and secondary AAA information)

(3) Processing result and reason why processing is impossible: a processing result for a group management request, and a reason why processing is impossible if it is impossible to process the group management request.

In step 5, although the UE is subscribed to a network 2, it may be assumed that information about a new group, for example, a new VN group is not configured. So, the UE may perform a registration process by including requested NSSAI information according to information previously stored by the UE (registration with DNN/NSSAI Update). In the registration process, the AMF may retrieve subscription information from the UDM. The AMF may recognize required NSSAI of the UE based on the subscription information, and include the required NSSAI of the UE in allowed NSSAI to transmit the allowed NSSAI to the UE. If necessary, a URSP update operation may also be performed during the registration process. If necessary according to updated NSSAI information, the UE may perform the registration process again. The operation of re-performing the registration process according to the updated NSSAI information will be described with reference to FIG. 7, so a detailed description thereof will be omitted herein.

In step 6, a UE establishes a PDU session using a corresponding DNN and S-NSSAI with reference to the URSP (PDU session establishment).

In step 7, the SMF may retrieve subscription information, for example, subscription data from the UDM (subscription data retrieval). The SMF may identify whether the UE is joined to a group specified by the DNN and the S-NSSAI.

In step 8, the SMF may perform a secondary authentication/authorization process if necessary based on the information retrieved from the UDM (Secondary AA). In the secondary authentication/authorization process, an eVN Network ID, a DNN, S-NSSAI, a PDU Session Type, an application descriptor, and secondary AA information may be used. In the secondary authentication/authorization process, the additional information may be exchanged with the UE to perform authentication up to a DN-AAA, and a detailed description of the secondary authentication/authorization process will be omitted.

In step 9, the SMF selects a PCF based on the subscription information retrieved from the UDM in step 7 (PCF Selection).

In step 10, the SMF performs a policy association operation with the PCF. Thereafter, the SMF may transmit and receive policy association information for a corresponding PDU session to and from the PCF.

In step 11, the SMF selects a UPF which processes traffic for a 5G VN mapped to a DNN and S-NSSAI based on the information received in step 7, the information, e.g., the subscription information, received from the UDM, the information, e.g., the policy association information for the PDU session, received from the PCF in step 10, and/or the like (UPF Selection).

In step 12, the SMF establishes or modifies an N4 session with the UPF (N4 session establishment/modification). In this case, the SMF may transmit a filter rule for classifying traffic and a forwarding rule specifying how to forward the classified traffic. In this case, a response to the PDU session establishment request started in step 6 may be transmitted to the UE and a next generation nodeB (gNB). In this case, if the SMF is capable of connecting to a UPF specified by an eVN network ID, eVN S-NSSAI, and an eVN DNN, the SMF may establish an N19 interface between a corresponding UPF and a local UPF. If the same operator manages a co-located or logically separated network, and/or the like, it is possible to establish an N19 interface between corresponding UPFs. In addition, even if operators are different, it is possible to establish an N19 interface between corresponding UPFs through service level agreement (SLA) between the operators.

In step 13, the UE transmits traffic delivered to a 5GVN to the UPF (Ethernet Traffic to 5GVN).

In step 14, the UPF classifies the traffic received from the UE based on the filter rule received from the SMF in step 12, and delivers the classified data based on the forwarding rule received from the SMF in step 12 according to a result of classifying (local switching/FWD to common DN/N19). If the traffic received from the UE needs to be transmitted to another UE within a group in which the UPF exists, the traffic received from the UE may be locally switched within the UPF. On the other hand, if the traffic received from the UE needs to be transmitted to a terminal outside the group in which the UPF exists, the traffic received from the UE may be transmitted to another UPF through an N19 interface or to a DN through an N6 interface.

In step 15, the UPF transmits traffic to another UE according to the result determined in step 14. For example, if the traffic received from the UE needs to be transmitted to another UE within the group in which the UPF exists, the UPF may transmit the traffic to the other UE through local switching within the UPF.

In step 16, the UPF transmits traffic to a UPF in charge of the entire traffic through the N19 interface, or to a common DN according to the result determined in step 14. For example, if the traffic received from the UE needs to be transmitted to the terminal outside the group in which the UPF exists, the UPF transmits the traffic to the UPF in charge of the entire traffic through the N19 interface or to the DN through the N6 interface.

Figure 7:
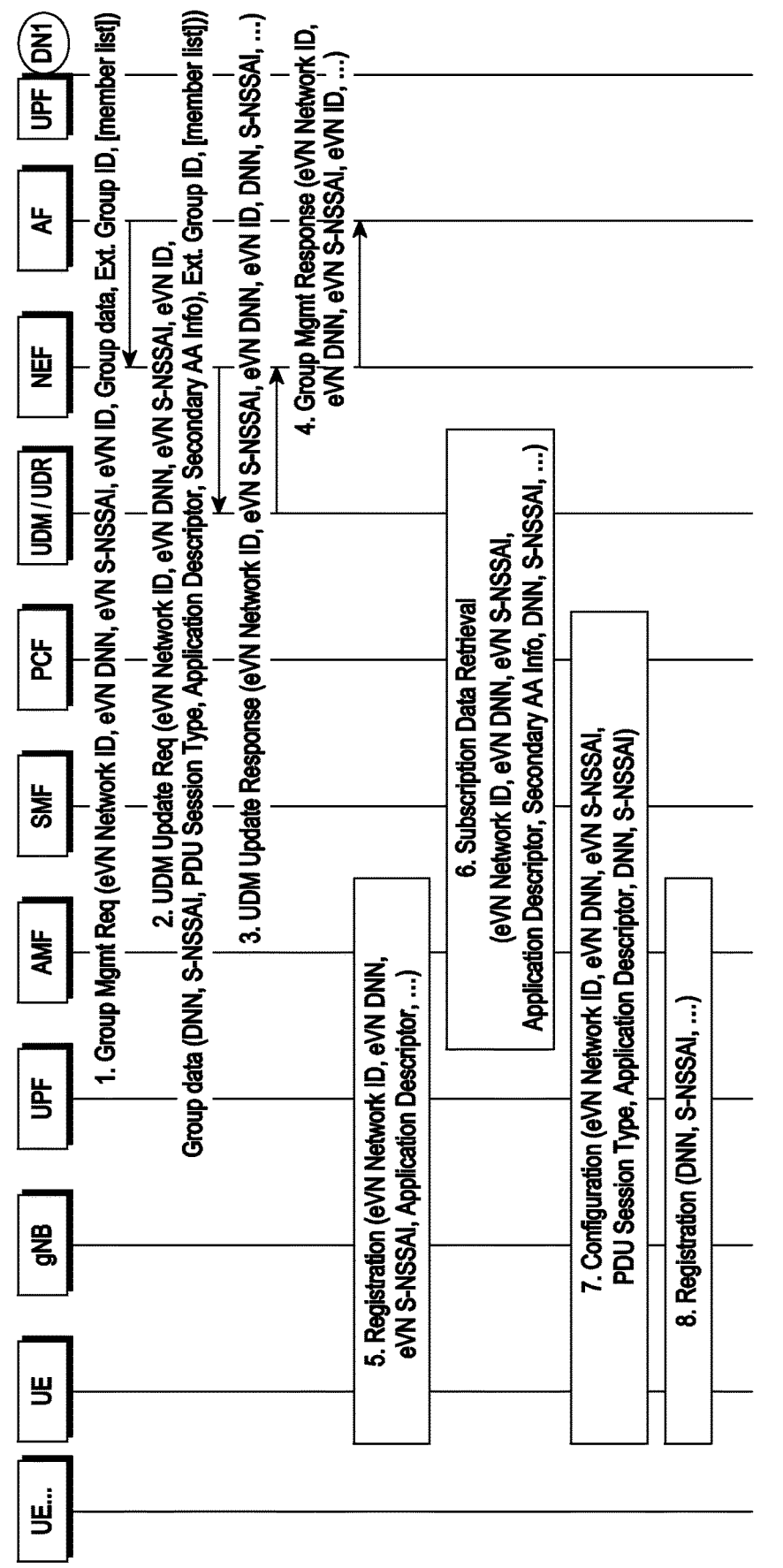
FIG. 7 is a diagram schematically illustrating a data network name/network slice selection assistance information (DNN/NSSAI) update process in a procedure for configuring a VN spanning a plurality of networks in a second and subsequent networks in a wireless communication network according to an embodiment of the disclosure.

FIG. 7 is a diagram schematically illustrating a DNN/NSSAI update process in a procedure for configuring a VN spanning a plurality of networks in a second and subsequent networks in a wireless communication network according to an embodiment of the disclosure.

Referring to FIG. 7, in step 1, an AF transmits, to an NEF, a group management request (group mgmt req) message including at least one of data to be used in the entire networks, for example, a plurality of networks included in a VN, an eVN ID, and group data. Here, the AF may include the data to be used in the entire networks, for example, the plurality of networks included in the VN.

The AF may include at least one of eVN S-NSSAI, an eVN DNN, or eVN network ID to be used in the entire networks in the group management request message.

Upon receiving the group management request from the AF, the NEF transmits a UDM update request (UDM Update Req) message to the UDM in step 2. The UDM update request message may include a DNN and S-NSSAI allocated in a network in which the NEF is included and a network ID of a corresponding network, and the eVN DNN, the eVN S-NSSAI, and the eVN DNN received through the group management request message.

Meanwhile, in step 1, the AF may transmit a group member addition request message or a group member deletion request message for adding or deleting a member in the group. The group member addition request message or the group member deletion request message may include at least one of the following.

(1) External group ID: an ID identifying a VN within a network (2) List of GPSI: a 5G VN group member list, and each group member included in a 5G VN group member list may be specified by a GPSI.

In addition, in step 2, the NEF may transmit a request message to the UDM, and the request message may include at least one of the following.

(1) Information to be used in the entire network: an eVN ID, an eVN network ID, an eVN DNN, and eVN S-NSSAI.

(2) Information to be used in a corresponding network group data (a DNN, S-NSSAI, a PDU session type, an application descriptor, and secondary AAA information)

The UDM may read necessary data from a UDR, and may store updated information in the UDR. The UDR may inform a PCF of the updated information through a notification message. Upon receiving the notification message including the updated information from the UDR, the PCF may transmit a URSP update message to UEs specified by a GPSI received from the AF. The UDM may transmit a notification message including the updated information to an AMF or an SMF.

Upon receiving the UDM update request message from the NEF, the UDM transmits a UDM update response (UDM update rsp) message which is a response message to the UDM update request message to the NEF in step 3. The UDM update response message may include at least one of the following.

(1) Information to be used in the entire network: an eVN ID, an eVN network ID, an eVN DNN, and eVN S-NSSAI (2) Information to be used in a corresponding network: group data (a DNN, S-NSSAI, a PDU session type, an application descriptor, and secondary AAA information)

(3) Processing result and reason why processing is impossible: a processing result for a UDM update request, and a reason why processing is impossible if it is impossible to process the UDM update request.

Upon receiving the UDM update response message from the UDM, in step 4, the NEF transmits, to the AF, a group management response (group mgmt rsp) message which is a response message to the group management request message received in step 1. The group management response message may include one of the following.

(1) Information to be used in the entire network: an eVN ID, an eVN Network ID, an eVN DNN, and eVN S-NSSAI (2) Information to be used in a corresponding network: group data (a DNN, S-NSSAI, a PDU session type, an application descriptor, and secondary AAA information)

(3) Processing result and reason why processing is impossible: a processing result for a group management request, and a reason why processing is impossible if it is impossible to process the group management request.

In step 5, it may be assumed that the UE does not configure information about a new group, for example, a new VN group. Accordingly, because the UE does not know a DNN and S-NSSAI for the new VN group, the UE may perform a registration process by including requested NSSAI information according to information previously stored by the UE (registration (an eVN Network ID, an eVN DNN, eVN S-NSSAI, an application descriptor, or the like)). In this case, if the UE is provided with a 5G VN group service spanning the entire network in a network 1 or another network, the UE may include an eVN network ID, an eVN DNN, and eVN S-NSSAI information in a registration message.

In step 6, if the UE is subscribed to a network 2, the AMF may retrieve subscription information from the UDM ((subscription data retrieval (an eVN network ID, an eVN DNN, eVN S-NSSAI, an application descriptor, secondary AA Info, a DNN, S-NSSAI, or the like)). In this case, the SMF may recognize a DNN and NSSAI required for a corresponding UE in the network 2 for the 5G VN group service based on the subscription information retrieved from the UDM.

If the UE is subscribed only to the network 1 and not to the network 2, the UE may be provided with a local breakout service while roaming in the network 2. In this case, the AMF may inquire the PCF in the network 2 based on an eVN Network ID, an eVN DNN, and eVN S-NSSAI among the subscription information received from the UDM in the network 1 to recognize the DNN and NSSAI required for the corresponding UE in network 2.

In step 7, the AMF may perform a configuration process based on the information obtained from the UDM in the network 1 and the PCF in the network 2 or the information obtained from the UDM in the network 2 in step 6 (configuration (an eVN Network ID and an eVN) DNN, eVN S-NSSAI, PDU session, application description, DNN, S-NSSAI)). The AMF may transmit a registration update message of the UE including an allowed NSSAI based on the information obtained from the UDM in step 6. In addition, a URSP update between the PCF and the UE may also be performed in the configuration process.

In step 8, the UE may re-perform the registration process by including NSSAI information which includes a DNN and S-NSSAI to be used in the network 2 for an updated 5G VN group communication.

An example of an internal structure of a terminal according to various embodiments of the disclosure will be described with reference to FIG. 8.

Figure 8:
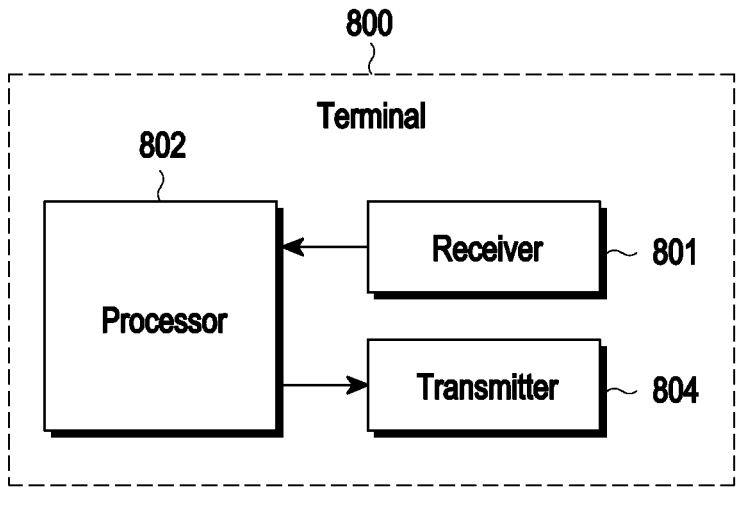
FIG. 8 is a block diagram schematically illustrating an internal structure of a terminal according to an embodiment of the disclosure.

FIG. 8 is a block diagram schematically illustrating an internal structure of a terminal according to an embodiment of the disclosure. An example of an internal structure of a terminal illustrated in FIG. 8 is for illustrative purposes only, so FIG. 8 does not limit the scope of the disclosure to any specific implementation of the terminal.

Referring to FIG. 8, a terminal 800 may include a receiver 801, a transmitter 804, and a processor 802. The receiver 801 and the transmitter 804 may collectively be referred to as a transceiver in embodiments of the disclosure. The transceiver may transmit/receive signals to/from a base station. The signals may include control information and data. To that end, the transceiver may include an RF transmitter for frequency-up converting and amplifying transmitted signals and an RF receiver for low-noise amplifying and frequency-down converting received signals. The transceiver may receive signals via a radio channel, output the signals to the processor 802, and transmit signals output from the processor 802 via a radio channel. The processor 802 may control a series of processes for the terminal 800 to be able to operate according to embodiments of the disclosure. The processor 802 may control overall operations related to a 5G VN as described in FIGS. 1 to 7. For example, the receiver 801 may receive signals related to the 5G VN from various network entities, and the processor 802 may control to transmit signals related to the 5G VN to various network entities and to receive signals related to the 5G VN from various network entities, according to various embodiments of the disclosure. Further, the transmitter 804 may transmit a determined signal at a determined time point.

An example of an internal structure of a base station according to various embodiments of the disclosure will be described with reference to FIG. 9.

Figure 9:
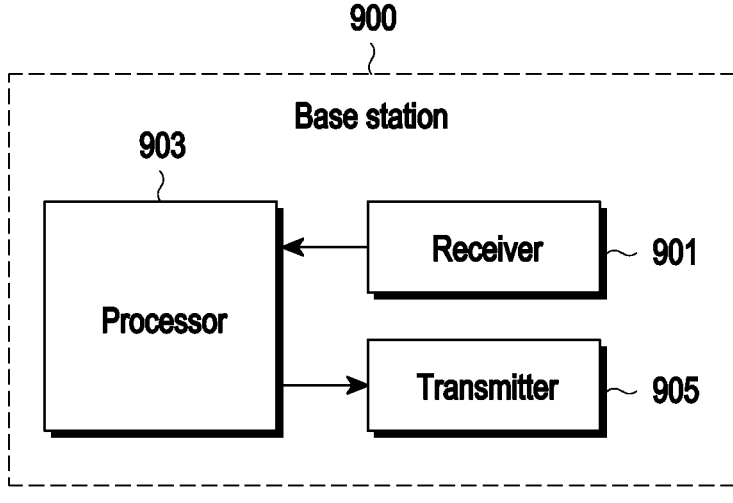
FIG. 9 is a block diagram schematically illustrating an internal structure of a base station according to an embodiment of the disclosure.

FIG. 9 is a block diagram schematically illustrating an internal structure of a base station according to an embodiment of the disclosure. An example of an internal structure of a base station illustrated in FIG. 9 is for illustrative purposes only, so FIG. 9 does not limit the scope of the disclosure to any specific implementation of the base station.

Referring to FIG. 9, a base station 900 may include a receiver 901, a transmitter 905, and a processor 903. The base station 900 may be a terrestrial base station or a part of a satellite. The receiver 901 and the transmitter 905 may collectively be referred to as a transceiver in embodiments of the disclosure. The transceiver may transmit/receive signals to/from a terminal. The signals may include control information and data. To that end, the transceiver may include an RF transmitter for frequency-up converting and amplifying transmitted signals and an RF receiver for low-noise amplifying and frequency-down converting received signals. The transceiver may receive signals via a radio channel, output the signals to the processor 903, and transmit signals output from the processor 903 via a radio channel.

The processor 903 may control a series of processes for the base station 900 to be able to operate according to embodiments of the disclosure. The processor 903 may control overall operations related to a 5G VN as described in FIGS. 1 to 7.

Another example of an internal structure of a base station according to embodiments of the disclosure will be described with reference to FIG. 10.

Figure 10:
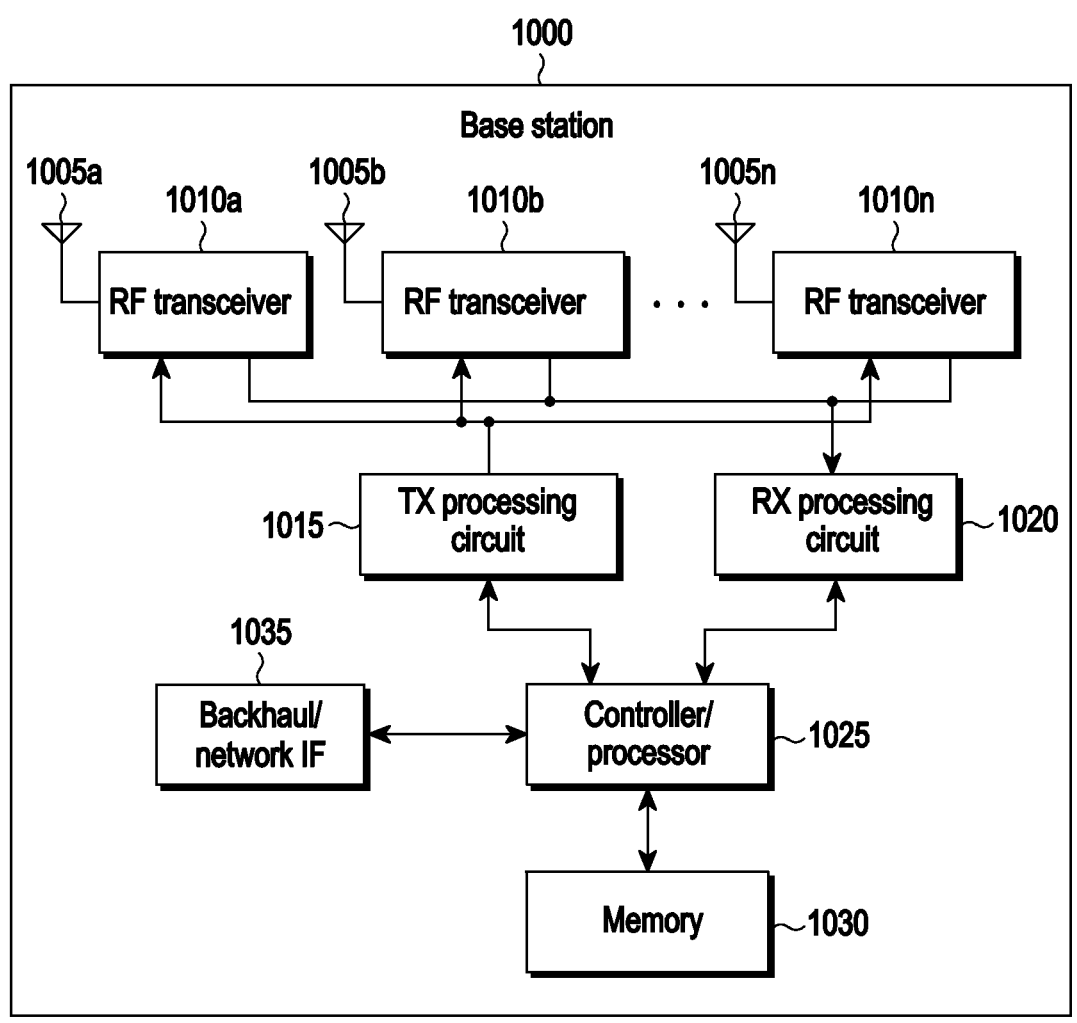
FIG. 10 is a diagram schematically illustrating an internal structure of a base station according to an embodiment of the disclosure.

FIG. 10 is a diagram schematically illustrating an internal structure of a base station according to an embodiment of the disclosure. An example of an internal structure of a base station illustrated in FIG. 10 is for illustrative purposes only, so FIG. 10 does not limit the scope of the disclosure to any specific implementation of the base station.

Referring to FIG. 10, a base station 1000 includes a plurality of antennas 1005a to 1005n, a plurality of RF transceivers 1010a to 1010n, a transmit (TX) processing circuit 1015, and a receive (RX) processing circuit 1020.

The base station 1000 further includes a controller/processor 1025, a memory 1030, and a backhaul or network interface 1035.

The RF transceivers 1010a to 1010n receive input RF signals, such as signals transmitted from terminals in the network, through the antennas 1005a to 1005n. The RF transceivers 1010a to 1010n down-convert the input RF signals to generate IF or baseband signals. The IF or baseband signals are transmitted to the RX processing circuit 1020, and the RX processing circuit 1020 filters, decodes, and/or digitizes the baseband or IF signals to generate processed baseband signals. The RX processing circuit 1020 transmits the processed baseband signals to the controller/processor 1025 for further processing.

The TX processing circuit 1015 receives analog or digital data, such as speech data, web data, emails, or interactive video game data, from the controller/processor 1025. The TX processing circuit 1015 encodes, multiplexes, and/or digitizes the output baseband data to generate processed baseband or IF signals. The RF transceivers 1010a to 1010n receive the processed baseband or IF signals output from the TX processing circuit 1015 and up-convert the baseband or IF signals into RF signals which are to be transmitted through the antennas 1005a to 1005n.

The controller/processor 1025 may include one or more processors or other processing devices that control the overall operation of the base station 1000. In one example, the controller/processor 1025 may control reception of forward channel signals and transmission of reverse channel signals by the RF transceivers 1010a to 1010n, the processing circuit 1020, and the TX processing circuit 1015 according to known principles. The controller/processor 1025 may support additional functions, such as more advanced wireless communication functions.

According to various embodiments of the disclosure, the controller/processor 1025 may control, for example, overall operations related to a 5G VN as described in FIGS. 1 to 7.

Further, the controller/processor 1025 may support beamforming or directional routing operations in which signals output from the plurality of antennas 1005a to 1005n are differently weighted to efficiently steer the signals output in a desired direction. Any of other various functions may be supported by the controller/processor 1025 in the base station 1000.

The controller/processor 1025 may also execute programs and other processes, e.g., an OS, resident in the memory 1030. The controller/processor 1025 may move data as required by a running process to the memory 1030 or the outside of the memory 1030.

The controller/processor 1025 is connected with the backhaul or network interface 1035. The backhaul or network interface 1035 allows the base station 1000 to communicate with other devices or systems over a backhaul connection or over a network. The backhaul or network interface 1035 may support communications over any appropriate wired or wireless connection(s). For example, when the base station 1000 is implemented as a part of a cellular communication system (such as a cellular communication system supporting 5G, LTE, or LTE-A), the backhaul or network interface 1035 allows the base station 1000 to communicate with other base stations via a wired or wireless backhaul connection. When the base station 1000 is implemented as an access point, the backhaul or network interface 1035 allows the base station 1000 to communicate with a larger network (e.g., the Internet) via a wired or wireless local area network or a wired or wireless connection. The backhaul or network interface 1035 includes an appropriate structure to support communications through a wired or wireless connection, such as Ethernet or RF transceiver.

The memory 1030 is connected to the controller/processor 1025. A portion of the memory 1030 may include a RAM, and another portion of the memory 1030 may include a flash memory or another ROM.

Although FIG. 10 illustrates an example base station, various changes may be made thereto. As an example, the base station 1000 may include any number of such components as illustrated in FIG. 10. As an example, an access point may include a plurality of interfaces 1035, and the controller/processor 1025 may support routing functions to route data between different network addresses. Although FIG. 10 illustrates that the base station 1000 includes a single instance of the TX processing circuit 1015 and a single instance of the RX processing circuit 1020, the base station 1000 may include multiple instances (e.g., one for each RF transceiver). Various components of FIG. 10 may be combined together, or each component may be further divided or some components may be omitted or, as necessary, more components may be added.

Another example of an internal structure of a terminal according to embodiments of the disclosure will be described with reference to FIG. 11.

Figure 11:
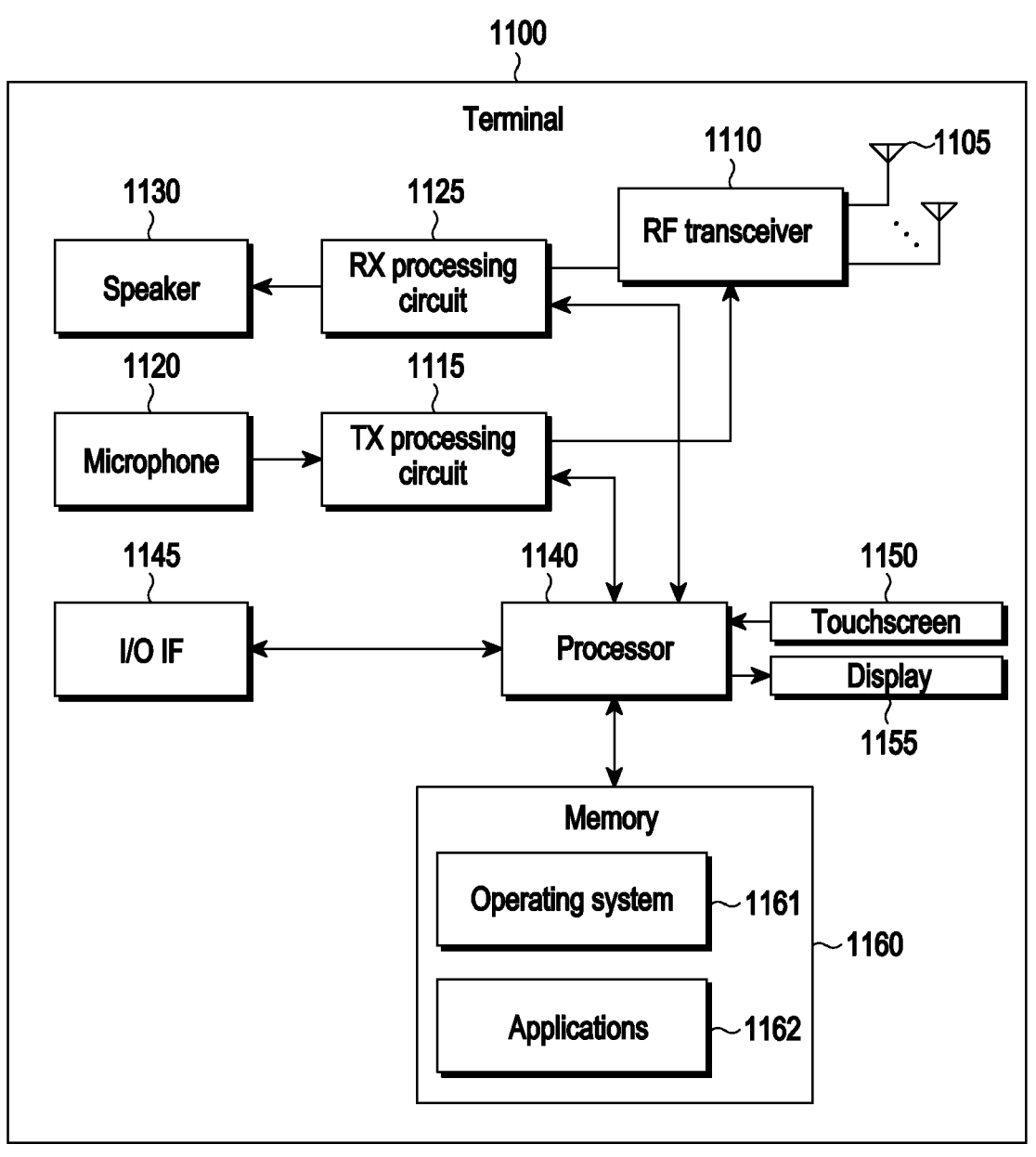
FIG. 11 is a diagram schematically illustrating an internal structure of a terminal according to an embodiment of the disclosure.

FIG. 11 is a diagram schematically illustrating an internal structure of a terminal according to an embodiment of the disclosure. An example of an internal structure of a terminal illustrated in FIG. 11 is for illustrative purposes only, so FIG. 11 does not limit the scope of the disclosure to any specific implementation of the terminal.

Referring to FIG. 11, a terminal 1100 may include an antenna 1105, a radio frequency (RF) transceiver 1110, a transmit (TX) processing circuit 1115, a microphone 1120, and a receive (RX) processing circuit 1125. The terminal 1100 further includes a speaker 1130, a processor 1140, an input/output (I/O) interface (IF) 1145, a touch screen 1150, a display 1155, and a memory 1160. The memory 1160 includes an operating system (OS) 1161 and one or more applications 1162.

The RF transceiver 1110 receives an input RF signal transmitted from a base station in a network, via the antenna 1105. The RF transceiver 1110 down-converts the input RF signal to generate an intermediate frequency (IF) or baseband signal. The IF or baseband signal is transmitted to the RX processing circuit 1125, and the RX processing circuit 1125 filters, decodes, and/or digitizes the baseband or IF signal to generate a processed baseband signal. The RX processing circuit 1125 transmits the processed baseband signal to the speaker 1130 (e.g., for speech data) or the processor 1140 (e.g., for web browsing data) for further processing.

The TX processing circuit 1115 receives analog or digital speech data from the microphone 1120 or other output baseband data (e.g., web data, emails, or interactive video game data) from the processor 1140. The TX processing circuit 1115 encodes, multiplexes, and/or digitizes the output baseband data to generate a processed baseband or IF signal. The RF transceiver 1110 receives the processed baseband or IF signal output from the TX processing circuit 1115 and up-converts the baseband or IF signal into an RF signal which is to be transmitted through the antenna 1105.

The processor 1140 may include one or more processors or other processing devices, and may execute the OS 1161 stored in the memory 1160 to control the overall operation of the terminal 1100. As an example, the processor 1140 may control reception of downlink channel signals and transmission of uplink channel signals by the RF transceiver 1110, the RF processing circuit 1125, and the TX processing circuit 1115 according to known principles. According to an embodiment of the disclosure, the processor 1140 includes at least one microprocessor or microcontroller.

According to an embodiment of the disclosure, the processor 1140 may control, for example, overall operations related to a 5G VN as described in FIGS. 1 to 7.

The processor 1140 may execute other processes and programs embedded in the memory 1160. The processor 1140 may move data into or out of the memory 1160 as required by a running process. According to an embodiment of the disclosure, the processor 1140 is configured to execute the applications 1162 based on the OS program 1161 or in response to signals received from base stations or the operator. The processor 1140 is coupled to the I/O interface 1145, and the I/O interface 1145 provides the terminal 1100 with connectability to other devices, e.g., laptop computers and handheld computers. The I/O interface 1145 is a communication path between these accessories and the processor 1140.

The processor 1140 is also connected to the touch screen 1150 and the display 1155. The operator of the terminal 1100 may input data into the terminal 1100 using the touch screen 1150. The display 1155 may be a liquid crystal display, a light emitting diode display, or other displays capable of rendering text and/or at least limited graphics, such as from websites.

The memory 1160 is connected to the processor 1140. A portion of the memory 1160 may include a random access memory (RAM), and the remainder of the memory 1160 may include a flash memory or a read-only memory (ROM).

Although FIG. 11 illustrates an example of a terminal, various changes may be made thereto. For example, various components of FIG. 11 may be combined together, each component may be further divided, or some components may be omitted, or other components may be added as necessary. As an example, the processor 1140 may be divided into multiple processors, such as one or more central processing units (CPUs) and one or more graphics processing units (GPUs). Although the terminal 1100 is configured like a mobile phone or a smart phone in FIG. 11, the terminal 1100 may be configured to operate as a different type of mobile or stationary device.

According to various embodiments of the disclosure, a method performed by a first network entity in a wireless communication network may be provided. The method may comprise transmitting, to a second network entity, a first message including at least one of data to be used in a plurality of networks included in a virtual network (VN) group, a VN identifier (ID), or group data, and receiving, from the second network entity in response to the first message, a second message including at least one of the data to be used in the plurality of networks, the VN ID, the group data, or information indicating a processing result related to the first message.

According to various embodiments of the disclosure, the data to be used in the plurality of networks may include at least one of a VN network ID indicating an ID of a network in which a third network entity to which the traffic to be used in the plurality of networks is to be transmitted is located, single network slice selection assistance information (S-NS-SAI) of the network in which the third network entity is located, an application descriptor indicating application characteristic information to be used to generate a user routing selection policy (URSP) to be transmitted to group members included in the VN group, or information related to secondary authentication and authorization.

According to various embodiments of the disclosure, the application descriptor may include a plurality of information instances.

According to various embodiments of the disclosure, the information related to the secondary authentication and authorization may include a data network (DN)-authentication/authorization/accounting (AAA) server address.

According to various embodiments of the disclosure, a method performed by a second network entity in a wireless communication network may be provided. The method may comprise receiving, from a first network entity, a first message including at least one of data to be used in a plurality of networks included in a virtual network (VN) group, a VN identifier (ID), or group data, transmitting, to a third network entity, a second message including at least one of information related to a network including the second network entity, a network ID of the network, and data to be used in the plurality of networks, receiving, from the third network entity in response to the second message, a third message including at least one of the data to be used in the plurality of networks, the information related to the network, or a processing result related to the second message, and transmitting, to the first network entity, a fourth message including at least one of the data to be used in the plurality of networks, the VN ID, the group data, or information indicating a processing result related to the first message.

According to various embodiments of the disclosure, the data to be used in the plurality of networks may include at least one of a VN network ID indicating an ID of a network in which a fourth network entity to which the traffic to be used in the plurality of networks is to be transmitted is located, single network slice selection assistance information (S-NSSAI) of the network in which the fourth network entity is located, an application descriptor indicating application characteristic information to be used to generate a user routing selection policy (URSP) to be transmitted to group members included in the VN group, or information related to secondary authentication and authorization.

According to various embodiments of the disclosure, the application descriptor may include a plurality of information instances.

According to various embodiments of the disclosure, the information related to the secondary authentication and authorization may include a data network (DN)-authentication/authorization/accounting (AAA) server address.

According to various embodiments of the disclosure, the information related to the network may include group data, and the group data may include at least one of a data network name (DNN), single network slice selection assistance information (S-NSSAI) of a network in which a fourth network entity to which the traffic to be used in the plurality of networks is to be transmitted is located, a protocol data unit (PDU) session type, an application descriptor indicating application characteristic information to be used to generate a user routing selection policy (URSP) to be transmitted to group members included in the VN group, or information related to secondary authentication and authorization.

According to various embodiments of the disclosure, the first network entity may be an application function (AF), the second network entity may be a network exposure function (NEF), the third network entity may be a policy control function (PCF), or the fourth network entity may be a unified data management (UDM).

According to various embodiments of the disclosure, a first network entity in a wireless communication network may be provided. The first network entity may comprise a transceiver, and at least one processor, wherein the at least one processor is configured to transmit, to a second network entity via the transceiver, a first message including at least one of data to be used in a plurality of networks included in a virtual network (VN) group, a VN identifier (ID), or group data, and receive, from the second network entity via the transceiver, in response to the first message, a second message including at least one of the data to be used in the plurality of networks, the VN ID, the group data, or information indicating a processing result related to the first message.

According to various embodiments of the disclosure, the data to be used in the plurality of networks may include at least one of a VN network ID indicating an ID of a network in which a third network entity to which the traffic to be used in the plurality of networks is to be transmitted is located, single network slice selection assistance information (S-NSSAI) of the network in which the third network entity is located, an application descriptor indicating application characteristic information to be used to generate a user routing selection policy (URSP) to be transmitted to group members included in the VN group, or information related to secondary authentication and authorization.

According to various embodiments of the disclosure, the application descriptor may include a plurality of information instances.

According to various embodiments of the disclosure, the information related to the secondary authentication and authorization may include a data network (DN)-authentication/authorization/accounting (AAA) server address.

According to various embodiments of the disclosure, a second network entity in a wireless communication network may be provided. The second network entity may comprise a transceiver, and at least one processor, wherein the at least one processor is configured to receive, from a first network entity via the transceiver, a first message including at least one of data to be used in a plurality of networks included in a virtual network (VN) group, a VN identifier (ID), or group data, transmit, to a third network entity via the transceiver, a second message including at least one of information related to a network including the second network entity, a network ID of the network, and data to be used in the plurality of networks, receive, from the third network entity via the transceiver, in response to the second message, a third message including at least one of the data to be used in the plurality of networks, the information related to the network, or a processing result related to the second message, and transmit, to the first network entity via the transceiver, a fourth message including at least one of the data to be used in the plurality of networks, the VN ID, the group data, or information indicating a processing result related to the first message.

According to various embodiments of the disclosure, the data to be used in the plurality of networks may include at least one of a VN network ID indicating an ID of a network in which a fourth network entity to which the traffic to be used in the plurality of networks is to be transmitted is located, single network slice selection assistance information (S-NSSAI) of the network in which the fourth network entity is located, an application descriptor indicating application characteristic information to be used to generate a user routing selection policy (URSP) to be transmitted to group members included in the VN group, or information related to secondary authentication and authorization.

According to various embodiments of the disclosure, the application descriptor may include a plurality of information instances.

According to various embodiments of the disclosure, the information related to the secondary authentication and authorization may include a data network (DN)-authentication/authorization/accounting (AAA) server address.

According to various embodiments of the disclosure, the information related to the network may include group data, and the group data includes at least one of a data network name (DNN), single network slice selection assistance information (S-NS SAI) of a network in which a fourth network entity to which the traffic to be used in the plurality of networks is to be transmitted is located, a protocol data unit (PDU) session type, an application descriptor indicating application characteristic information to be used to generate a user routing selection policy (URSP) to be transmitted to group members included in the VN group, or information related to secondary authentication and authorization.

According to various embodiments of the disclosure, the first network entity may be an application function (AF), the second network entity may be a network exposure function (NEF), the third network entity may be a policy control function (PCF), or the fourth network entity may be a unified data management (UDM).

In various embodiments of the disclosure, in a wireless communication network, if the same group, for example, a 5G VN group, is supported across a plurality of networks which are physically located at the same place or logically separated, efficient transmission for traffic may be supported.

Methods according to embodiments described in the claims or specifications of the disclosure may be implemented in the form of hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Alternatively, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments via an external port. A separate storage device over the communication network may be connected to the device that performs embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an application function (AF) in a wireless communication network, the method comprising:
transmitting, to a network exposure function (NEF), a first message including data to be used in a plurality of networks included in a virtual network (VN) group, a VN identifier (ID), and group data; and
receiving, from the NEF in response to the first message, a second message including the data to be used in the plurality of networks, the VN ID, the group data, a first single network slice selection assistance information (S-NSSAI) used for a VN within a first network in which the NEF belongs, and information indicating a processing result related to the first message,
wherein the data to be used in the plurality of networks includes a VN network ID indicating an ID of a second network in which a user plane function (UPF) to which traffic to be used in the plurality of networks is to be transmitted is located, and a second S-NSSAI of used for the VN across the plurality of networks including the second network in which the UPF is located, and
wherein the first S-NSSAI is mapped to the second S-NSSAI.

2. The method of claim 1, wherein the data to be used in the plurality of networks further includes at least one of:
an application descriptor indicating application characteristic information to be used to generate a user routing selection policy (URSP) to be transmitted to group members included in the VN group; or
information related to secondary authentication and authorization.

3. The method of claim 2, wherein the application descriptor includes a plurality of information instances.

4. The method of claim 2, wherein the information related to the secondary authentication and authorization includes a data network (DN)-authentication/authorization/accounting (AAA) server address.

5. A method performed by a network exposure function (NEF) in a wireless communication network, the method comprising:
receiving, from an application function (AF), a first message including data to be used in a plurality of networks included in a virtual network (VN) group, a VN identifier (ID), and group data;
transmitting, to a unified data management (UDM), a second message including information related to a network including the NEF, a network ID of the network, and data to be used in the plurality of networks;
receiving, from the UDM in response to the second message, a third message including the data to be used in the plurality of networks, the information related to the network, and a processing result related to the second message; and
transmitting, to the AF, a fourth message including the data to be used in the plurality of networks, the VN ID, the group data, a first single network slice selection assistance information (S-NSSAI) used in for a VN within a first network in which the NEF belongs, and information indicating a processing result related to the first message,
wherein the data to be used in the plurality of networks includes a VN network ID indicating an ID of a second network in which a user plane function (UPF) to which traffic to be used in the plurality of networks is to be transmitted is located, and a second S-NSSAI used for the VN across the plurality of networks including the second network in which the UPF is located, and wherein the first S-NSSAI is mapped to the second S-NSSAI.

6. The method of claim 5, wherein the data to be used in the plurality of networks further includes at least one of:
an application descriptor indicating application characteristic information to be used to generate a user routing selection policy (URSP) to be transmitted to group members included in the VN group; or
information related to secondary authentication and authorization.

7. The method of claim 6, wherein the application descriptor includes a plurality of information instances.

8. The method of claim 6, wherein the information related to the secondary authentication and authorization includes a data network (DN)-authentication/authorization/accounting (AAA) server address.

9. The method of claim 6, wherein the information related to the network includes group data, and the group data includes at least one of:
a data network name (DNN);
the second S-NSSAI;
a protocol data unit (PDU) session type;
an application descriptor indicating application characteristic information to be used to generate a user routing selection policy (URSP) to be transmitted to group members included in the VN group; or
information related to secondary authentication and authorization.

10. An application function (AF) in a wireless communication network, the AF comprising:
a transceiver; and
at least one processor,
wherein the at least one processor is configured to:
transmit, to a network exposure function (NEF) via the transceiver, a first message including data to be used in a plurality of networks included in a virtual network (VN) group, a VN identifier (ID), and group data, and
receive, from the NEF via the transceiver, in response to the first message, a second message including the data to be used in the plurality of networks, the VN ID, the group data, a first single network slice selection assistance information (S-NSSAI) used for a VN within a first network in which the NEF belongs, and information indicating a processing result related to the first message,
wherein the data to be used in the plurality of networks includes a VN network ID indicating an ID of a second network in which a user plane function (UPF) to which traffic to be used in the plurality of networks is to be transmitted is located, and a second S-NSSAI used for the VN across the plurality of networks including the second network in which the UPF is located, and
wherein the first S-NSSAI is mapped to the second S-NSSAI.

11. The AF of claim 10, wherein the data to be used in plurality of networks further includes at least one of:
an application descriptor indicating application characteristic information to be used to generate a user routing selection policy (URSP) to be transmitted to group members included in the VN group; or
information related to secondary authentication and authorization.

12. The AF of claim 11, wherein the application descriptor includes a plurality of information instances.

13. The AF of claim 11, wherein the information related to the secondary authentication and authorization includes a data network (DN)-authentication/authorization/accounting (AAA) server address.

14. A network exposure function (NEF) in a wireless communication network, the NEF comprising:
a transceiver; and
at least one processor,
wherein the at least one processor is configured to:
receive, from an application function (AF) via the transceiver, a first message including data to be used in a plurality of networks included in a virtual network (VN) group, a VN identifier (ID), and group data,
transmit, to a unified data management (UDM) via the transceiver, a second message including information related to a network including the second network entity NEF, a network ID of the network, and data to be used in the plurality of networks,
receive, from the UDM via the transceiver, in response to the second message, a third message including the data to be used in the plurality of networks, the information related to the network, and a processing result related to the second message, and
transmit, to the AF via the transceiver, a fourth message including the data to be used in the plurality of networks, the VN ID, the group data, a first single network slice selection assistance information (S-NSSAI) used for a VN within a first network in which the NEF belongs, and information indicating a processing result related to the first message,
wherein the data to be used in the plurality of networks includes a VN network ID indicating an ID of a second network in which a user plane function (UPF) to which traffic to be used in the plurality of networks is to be transmitted is located, and a second S-NSSAI used for the VN across the plurality of networks including the second network in which the UPF is located, and
wherein the first S-NSSAI is mapped to the second S-NSSAI.

15. The NEF of claim 14, wherein the data to be used in the plurality of networks further includes at least one of:
an application descriptor indicating application characteristic information to be used to generate a user routing selection policy (URSP) to be transmitted to group members included in the VN group; or
information related to secondary authentication and authorization.

16. The NEF of claim 15, wherein the application descriptor includes a plurality of information instances.

17. The NEF of claim 15, wherein the information related to the secondary authentication and authorization includes a data network (DN)-authentication/authorization/accounting (AAA) server address.

18. The NEF of claim 15, wherein the information related to the network includes group data, and the group data includes at least one of:
a data network name (DNN);
the second S-NSSAI;
a protocol data unit (PDU) session type;

an application descriptor indicating application characteristic information to be used to generate a user routing selection policy (URSP) to be transmitted to group members included in the VN group; or information related to secondary authentication and authorization.

* * * * *